United States Patent
Charipadi

(10) Patent No.: US 11,134,460 B2
(45) Date of Patent: Sep. 28, 2021

(54) SYNCHRONIZING A CLOUD RADIO ACCESS NETWORK TO A NETWORK TIME PROTOCOL REFERENCE CLOCK

(71) Applicant: CommScope Technologies LLC, Hickory, NC (US)

(72) Inventor: Gopikrishna Charipadi, Bangalore (IN)

(73) Assignee: CommScope Technologies LLC, Hickory, NC (US)

(*) Notice: Subject to any disclaimer, the term of this patent is extended or adjusted under 35 U.S.C. 154(b) by 0 days.

(21) Appl. No.: 16/884,916

(22) Filed: May 27, 2020

(65) Prior Publication Data
US 2020/0404607 A1 Dec. 24, 2020

Related U.S. Application Data

(60) Provisional application No. 62/862,763, filed on Jun. 18, 2019.

(51) Int. Cl.
*H04W 56/00* (2009.01)

(52) U.S. Cl.
CPC ... *H04W 56/0055* (2013.01); *H04W 56/0015* (2013.01); *H04W 56/0035* (2013.01)

(58) Field of Classification Search
CPC .......... H04W 56/0015; H04W 64/003; H04W 64/006; H04L 67/10; G01S 5/0236; G01S 7/4865; G01S 19/05; G01S 7/4861; G01S 5/0231; G01S 5/04; G01S 3/14;
(Continued)

(56) References Cited

U.S. PATENT DOCUMENTS 9,271,247 B1 2/2016 Pearson et al.
9,961,688 B1* 5/2018 Anvari ................. H04L 47/193
9,998,310 B2 6/2018 Barbieri et al.
(Continued)

FOREIGN PATENT DOCUMENTS

KR 20110079872 A 7/2011
KR 20180071268 A 6/2018
(Continued)

OTHER PUBLICATIONS

International Searching Authority, "International Search Report and Written Opinion from PCT Application No. PCT/US2020/034707", from Foreign Counterpart to U.S. Appl. No. 16/884,916, dated Sep. 8, 2020, pp. 1 through 9, Published: WO.

*Primary Examiner* — Jung Liu
(74) *Attorney, Agent, or Firm* — Fogg & Powers LLC

(57) ABSTRACT

A cloud radio access network (C-RAN) includes a baseband controller communicatively coupled to a plurality of radio points (RP) via a fronthaul network. Each of the plurality of RPs are configured to exchange radio frequency (RF) signals with at least one user equipment (UE). At least one of the RPs is configured to determine a timing difference while synchronizing to the baseband controller; and determine a frequency error, between the RP and a neighboring base station, based on a radio environment monitoring (REM) procedure. A phase error is determined, between the baseband controller and the neighboring base station, phase error is determined based on the timing difference for the RP and baseband controller, and the frequency error for the RP and the neighboring base station.

25 Claims, 9 Drawing Sheets

(58) Field of Classification Search
CPC .......... G01S 1/042; G01S 5/12; G01S 13/765; G01S 5/10
See application file for complete search history.

(56) References Cited

U.S. PATENT DOCUMENTS

| | | | |
|---|---|---|---|
| 10,021,592 B1* | 7/2018 | Anvari | H04W 28/0289 |
| 10,064,149 B1* | 8/2018 | Anvari | H04W 56/0015 |
| 10,097,391 B2 | 10/2018 | Fertonani et al. | |
| 10,355,895 B2 | 7/2019 | Barbieri et al. | |
| 2007/0260906 A1* | 11/2007 | Corredoura | G06F 1/12 |
| | | | 713/400 |
| 2009/0161744 A1* | 6/2009 | Smith | H04B 3/462 |
| | | | 375/226 |
| 2014/0348181 A1 | 11/2014 | Chandra et al. | |
| 2015/0222276 A1* | 8/2015 | Milijevic | H03L 7/0991 |
| | | | 327/147 |
| 2016/0170439 A1* | 6/2016 | Aweya | G06F 1/10 |
| | | | 713/401 |
| 2016/0170440 A1* | 6/2016 | Aweya | H04L 69/28 |
| | | | 713/503 |
| 2016/0192382 A1* | 6/2016 | Soldati | H04W 72/082 |
| | | | 370/329 |
| 2017/0214516 A1* | 7/2017 | Rivaud | H04L 7/033 |
| 2017/0331575 A1 | 11/2017 | Ruffini et al. | |
| 2017/0373890 A1 | 12/2017 | Fertonani et al. | |
| 2018/0249346 A1* | 8/2018 | Plestid | H04W 16/24 |
| 2018/0287696 A1 | 10/2018 | Barbieri et al. | |
| 2018/0310269 A1* | 10/2018 | Mayer | H04W 56/0045 |
| 2019/0004563 A1* | 1/2019 | Nelson | H03K 5/082 |
| 2019/0007246 A1 | 1/2019 | Fertonani et al. | |
| 2019/0116568 A1 | 4/2019 | Fertonani et al. | |
| 2019/0174466 A1* | 6/2019 | Zhang | H04W 72/042 |
| 2019/0208575 A1 | 7/2019 | Barbieri et al. | |
| 2019/0285722 A1* | 9/2019 | Markhovsky | G01S 5/0231 |
| 2020/0021378 A1* | 1/2020 | Aweya | H04J 3/0644 |
| 2020/0021379 A1* | 1/2020 | Aweya | H04J 3/0673 |
| 2020/0045601 A1* | 2/2020 | Pedersen | H04W 36/08 |
| 2020/0076439 A1* | 3/2020 | Weeks | H03L 7/0992 |
| 2020/0077287 A1* | 3/2020 | Prasad | H04W 24/10 |
| 2020/0285265 A1* | 9/2020 | Ranganathan | G06F 1/12 |
| 2021/0067391 A1* | 3/2021 | Sengupta | H04J 13/004 |

FOREIGN PATENT DOCUMENTS

| | | |
|---|---|---|
| WO | 2016145371 A2 | 9/2016 |
| WO | 2017070635 A1 | 4/2017 |
| WO | 2018017468 A1 | 1/2018 |

* cited by examiner

SYNCHRONIZING A CLOUD RADIO ACCESS NETWORK TO A NETWORK TIME PROTOCOL REFERENCE CLOCK

CROSS-REFERENCE TO RELATED APPLICATIONS

This application claims priority to U.S. Provisional Patent Application No. 62/862,763 titled "SYNCHRONIZING A CLOUD RADIO ACCESS NETWORK TO A NETWORK TIME PROTOCOL REFERENCE CLOCK" and filed on Jun. 18, 2019, which is incorporated by reference in its entirety.

BACKGROUND

In a cloud radio access network (C-RAN), geographically-separate remote units are controlled by a controller and provide wireless service to user equipment (UEs). It may be desirable to synchronize a C-RAN to a Network Time Protocol (NTP) reference clock.

SUMMARY

A cloud radio access network (C-RAN) includes a baseband controller communicatively coupled to a plurality of radio points (RP) via a fronthaul network. Each of the plurality of RPs are configured to exchange radio frequency (RF) signals with at least one user equipment (UE). At least one of the RPs is configured to determine a timing difference while synchronizing to the baseband controller; and determine a frequency error, between the RP and a neighboring base station, based on a radio environment monitoring (REM) procedure. A phase error is determined, between the baseband controller and the neighboring base station, phase error is determined based on the timing difference for the RP and the baseband controller, and the frequency error for the RP and the neighboring base station.

DRAWINGS

Understanding that the drawings depict only exemplary configurations and are not therefore to be considered limiting in scope, the exemplary configurations will be described with additional specificity and detail through the use of the accompanying drawings, in which.

In accordance with common practice, the various described features are not drawn to scale but are drawn to emphasize specific features relevant to the exemplary configurations.

DETAILED DESCRIPTION

A cloud radio access network (C-RAN) may implement a cell using a baseband controller that communicates with multiple remote units (also referred to here as "radio points" or "RPs") in order to provide wireless service to various items of user equipment (UEs). The baseband controller may include an oscillator (e.g., implemented in a phase-locked loop (PLL)) to keep timing while communicating with the RPs and other devices.

Synchronizing the C-RAN to an NTP reference clock may present unique challenges because NTP synchronization occurs over a packet-switched network, which may have delay and/or jitter. Accordingly, the present systems and methods determine an initial phase error estimate (also referred to as a phase delay variation (PDV)), which reflects the timing error between the baseband controller and a neighboring base station, where the neighboring base station is presumed to be highly synchronized to a stable reference clock. This initial phase error estimate may be used as a proxy for the error between the baseband controller and an NTP grandmaster clock. Assuming this initial phase error is relatively accurate, the baseband controller may synchronize much quicker using it than performing a blind estimation at the beginning of NTP synchronization.

As used herein, the terms "clock" and "oscillator" may be used interchangeably. Additionally, where two computing devices are described as being "synchronized," or similar variants, it is understood that this refers to the oscillators within the computing devices being synchronized, e.g., within a required precision. Furthermore, while crystal oscillators are most commonly used, any suitable type of oscillator may be used with the systems and methods described herein.

The term "macro cell" is used interchangeably with "macro base station" herein to refer a stationary, non-distributed base station (not part of a C-RAN), which provides wireless service to mobile devices using high power signals. A macro cell will typically perform all L1-L3 functions.

The term "small cell" is used herein to refer to a low-power radio access node (not part of a C-RAN), which provides wireless service to mobile devices. Small cells are generally lower-power, shorter-range, and can serve fewer max concurrent users than macro base stations. For example, small cell(s) may be used to fill in coverage gaps in macro base station coverage, e.g., indoors, in urban environments, etc. Small cells may also be referred to as femto cells, femto base stations, pico cells, pico base stations, access points, etc.

C-RAN Overview

Figure 1:
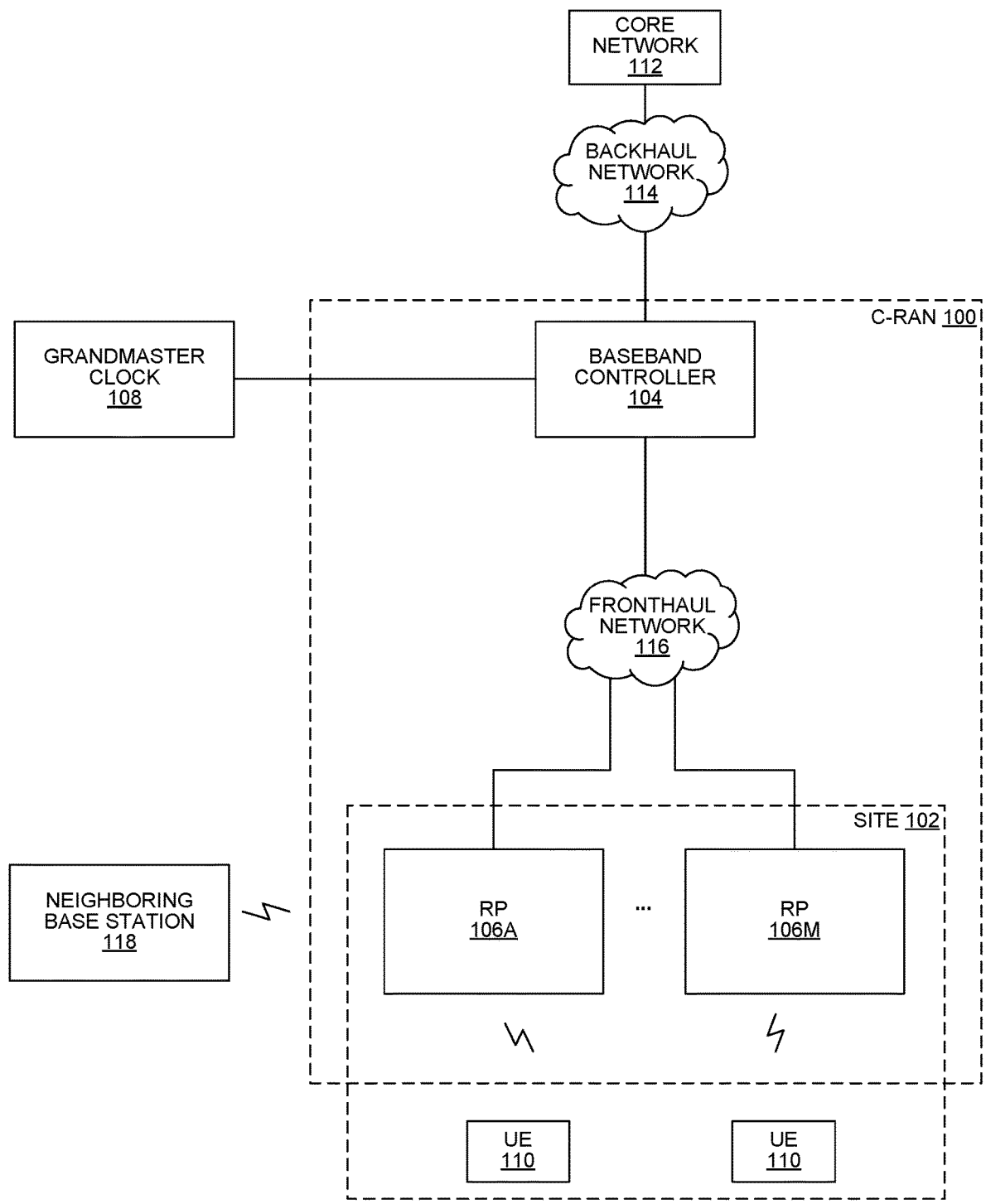
FIG. 1 is a block diagram illustrating an exemplary configuration of a communication system that synchronizes to a grandmaster clock.

FIG. 1 is a block diagram illustrating an exemplary configuration of a communication system 100 that synchronizes to a grandmaster clock 108. In the exemplary configuration shown in FIG. 1, the system 100 is implemented using the cloud radio access network (C-RAN) (point-to-multipoint distributed base station) architecture that employs at least one baseband unit 104 and multiple (e.g., M=32, 64, etc.) radio points (RPs) 106A-M that serve at least one cell.

The RPs 106 may be deployed at a site 102 to provide wireless coverage and capacity for one or more wireless network operators. The site 102 may be, for example, a building or campus or other grouping of buildings (used, for example, by one or more businesses, governments, other enterprise entities) or some other public venue (such as a hotel, resort, amusement park, hospital, shopping center, airport, university campus, arena, or an outdoor area such as a ski area, stadium or a densely-populated downtown area). In some configurations, the site 102 is at least partially (and optionally entirely) indoors, but other alternatives are possible.

The system 100 may also be referred to here as a "C-RAN" or a "C-RAN system." The baseband unit 104 is also referred to here as "baseband controller" 104, "CU" 104, or just "controller" 104. Each RP 106 may include or be coupled to at least one antenna used to radiate downlink RF signals to user equipment (UEs) 110 and receive uplink RF signals transmitted by UEs 110. The baseband controller 104 may optionally be physically located remotely from the site 102, e.g., in a centralized bank of baseband controllers 104. Additionally, the RPs 106 may be physically separated from each other within the site 102, although they are each communicatively coupled to the baseband controller 104 via a fronthaul network 116.

Each UE 110 may be a computing device with at least one processor that executes instructions stored in memory, e.g., a mobile phone, tablet computer, mobile media device, mobile gaming device, laptop computer, vehicle-based computer, a desktop computer, etc. Each baseband controller 104, RP 106, and neighboring base station 118 may be a computing device with at least one processor that executes instructions stored in memory.

The system 100 is coupled to a core network 112 of each wireless network operator over an appropriate backhaul network 114. For example, the Internet may be used for backhaul between the system 100 and each core network 112. However, it is understood that the backhaul network 114 can be implemented in other ways. Each of the backhaul network 114 and the fronthaul network 116 described herein may be implemented with one or more switches, routers, and/or other networking devices, e.g., the backhaul network 114 and/or the fronthaul network 116 may be implemented with a switched ETHERNET network.

The system 100 may be implemented as a Long Term Evolution (LTE) radio access network providing wireless service using an LTE air interface. LTE is a standard developed by the 3GPP standards organization. In this configuration, the baseband controller 104 and RPs 106 together are used to implement an LTE Evolved Node B (also referred to here as an "eNodeB" or "eNB"). An eNB may be used to provide UEs 110 with mobile access to the wireless network operator's core network 112 to enable UEs 110 to wirelessly communicate data and voice (using, for example, Voice over LTE (VoLTE) technology). However, it should be noted that the present systems and methods may be used with other wireless protocols, e.g., the system 100 may be implemented as a 3GPP 5G RAN providing wireless service using a 5G air interface.

Also, in an exemplary LTE configuration, each core network 112 may be implemented as an Evolved Packet Core (EPC) 112 comprising standard LTE EPC network elements such as, for example, a mobility management entity (MME) and a Serving Gateway (SGW) and, optionally, a Home eNB gateway (HeNB GW) (not shown) and a Security Gateway (SeGW or SecGW) (not shown).

Moreover, in an exemplary LTE configuration, each baseband controller 104 may communicate with the MME and SGW in the EPC core network 112 using the LTE S1 interface and communicates with eNBs using the LTE X2 interface. For example, the baseband controller 104 can communicate with an outdoor macro eNB (not shown) via the LTE X2 interface.

Each baseband controller 104 and radio point 106 can be implemented so as to use an air interface that supports one or more of frequency-division duplexing (FDD) and/or time-division duplexing (TDD). Also, the baseband controller 104 and the radio points 106 can be implemented to use an air interface that supports one or more of the multiple-input-multiple-output (MIMO), single-input-single-output (SISO), single-input-multiple-output (SIMO), multiple-input-single-output (MISO), and/or beam forming schemes. For example, the baseband controller 104 and the radio points 106 can implement one or more of the LTE transmission modes. Moreover, the baseband controller 104 and the radio points 106 can be configured to support multiple air interfaces and/or to support multiple wireless operators.

In some configurations, in-phase, quadrature-phase (I/Q) data representing pre-processed baseband symbols for the air interface is communicated between the baseband controller 104 and the RPs 106. Communicating such baseband I/Q data typically requires a relatively high data rate front haul. The connections in and/or for the fronthaul network may be implemented using fiber or ETHERNET, where ETHERNET may be a more cost-effective option.

In some configurations, a baseband signal can be pre-processed at a source RP 106 and converted to frequency domain signals (after removing guard band/cyclic prefix data, etc.) in order to effectively manage the fronthaul rates, before being sent to the baseband controller 104. The RP 106 can further reduce the data rates by quantizing such frequency domain signals and reducing the number of bits used to carry such signals and sending the data. In a further simplification, certain symbol data/channel data may be fully processed in the source RP 106 itself and only the resultant information is passed to the baseband controller 104.

The Third Generation Partnership Project (3GPP) has adopted a layered model for the LTE radio access interface. Generally, some combination of the baseband controller 104 and RPs 106 perform analog radio frequency (RF) functions for the air interface as well as digital Layer 1 (L1), Layer 2 (L2), and Layer 3 (L3) (of the 3GPP-defined LTE radio access interface protocol) functions for the air interface. Any suitable split of L1-L3 processing (between the baseband controller 104 and RPs 106) may be implemented. Where baseband signal I/Q data is fronthauled between the baseband controller 104 and the RPs 106, each baseband controller 104 can be configured to perform all or some of the digital L1, L2, and L3 processing for the air interface. In this case, the L1 functions in each RP 106 is configured to implement the digital L1 processing for the air interface.

Where the fronthaul ETHERNET network 116 is not able to deliver the data rate need to front haul (uncompressed) time-domain I/Q data, the time-domain I/Q data can be compressed prior to being communicated over the ETHERNET network 116, thereby reducing the data rate needed communicate such I/Q data over the ETHERNET network 116.

Data can be fronthauled between the baseband controller 104 and RPs 106 in other ways (for example, using fronthaul interfaces and techniques specified in the Common Public Radio Interface (CPRI) and/or Open Base Station Architecture Initiative (OBSAI) family of specifications).

Additionally, it should be noted that the present systems and methods may also be used in other distributed RANs (in addition to a C-RAN 100), e.g., a distributed antenna system (DAS).

Although not shown, a management system may be communicatively coupled to the baseband controller 104 and RPs 106, for example, via the backhaul network 114 and the fronthaul network 116 (in the case of the RPs 106). The management system may send and receive management communications to and from the baseband controller 104, each of which in turn forwards relevant management communications to and from the RPs 106.

Challenges with Synchronizing a C-RAN to an NTP Grandmaster Clock

The baseband controller 104 includes an oscillator (optionally more than one), which is used to keep time for the C-RAN 100. The oscillator in the baseband controller 104 may be a crystal oscillator, such as an oven controlled crystal oscillator (OCXO). In some configurations, the C-RAN 100 may implement an LTE Evolved Node B (also referred to here as an "eNodeB" or "eNB"), an LTE Next Generation eNodeB (ng-eNB), and/or a 5G Next Generation NodeB (gNB controller), which is expected to provide a stable timing reference to the UEs 110 it provides wireless service to. By using the baseband controller 104 oscillator as a master clock, the UEs 110 can use inexpensive, less-precise oscillators. The baseband controller 104, therefore, may attempt to synchronize its oscillator to a grandmaster clock 108. The grandmaster clock 108 may be a computing device that includes a universal stable reference clock, e.g., from a Global Positioning System (GPS), Precision Time Protocol (PTP), NTP, etc.

Synchronizing a baseband controller 104 to a Network Time Protocol (NTP) grandmaster clock 108 presents unique challenges. NTP is an internet datagram-based timing protocol that distributes time information on packet-switched networks (e.g., the Internet) so that computing devices on the networks can synchronize their clock to this standard clock source. NTP uses a layered architecture, which includes a trusted source clock, based on a precision clock source (e.g., an atomic clock), at its root source (also referred to as the highest stratum or stratum zero), which is distributed via NTP Servers across the network (e.g., the Internet) over multiple hops to lower strata, e.g., strata 2, 3, etc. Accordingly, the grandmaster clock 108 (e.g., an NTP grandmaster clock 108) may be distributed to the baseband controller 104 via one or more hops/strata.

As a result of such stratum-based architecture, NTP datagrams, since they share the internet network with normal traffic, are likely impacted by network congestion and may exhibit delays and jitter. Consequently, the initial phase error between NTP time and the baseband controller's oscillator may be large. A large initial phase error may cause a large delay (e.g., up to dozens of minutes) before the phase error (e.g., between the baseband controller 104 oscillator and the grandmaster clock 108) can converge to the required timing precision (e.g., 320 ns, which translates to 20-30 parts-per-billion (ppb) on the oscillator) necessary for wireless communications, e.g., according to LTE or 5G.

Solution Overview

In order to account for the delay and/or jitter caused by network congestion, an initial phase error (e.g., between the baseband controller 104 oscillator and the grandmaster clock 108) may be estimated using a radio environment monitoring (REM) based procedure. If the C-RAN 100 (e.g., baseband controller 104 and/or RP(s) 106) is initialized in the field (referred to as Plug and Play (PnP) initialization), the baseband controller 104 oscillator must synchronize to the grandmaster clock 108 (and the RP 106 oscillators to the baseband controller 104 oscillator) before the C-RAN 100 can provide wireless service to nearby UEs 110. The present systems and methods may reduce convergence time of an NTP synchronization procedure (e.g., to within 1-2 minutes) to achieve the required accuracy of 20-30 ppb. In other words, the initial phase error estimation described herein may reduce the amount of time for the error between the baseband controller's oscillator and the NTP grandmaster clock 108 to converge to a required timing precision. Reduced convergence time, in turn, will reduce the overall PnP initialization time of the baseband controller 104 (or the entire C-RAN 100).

Specifically, the initial phase error (between the baseband controller's oscillator and the NTP grandmaster clock 108) may be estimated using downlink signals from the neighboring base station 118. First, a timing difference (delta1) may be determined between at least one RP 106 and the baseband controller 104. Additionally, an enhanced radio environment monitoring (REM) procedure in the at least one RP 106 may be used to estimate a frequency error (e.g., in units of Hz) that can be converted to a timing error (delta2, e.g., in units of seconds) between the at least one RP 106 and at least one neighboring base station 118 (macro cell or small cell not belonging to the C-RAN 100). Since the neighboring base stations 118 are expected to be highly synchronized (e.g., with very small timing difference) to a universal clock reference (NTP, PTP, GPS), an estimate of the local timing reference can be derived. In other words, each frequency error may indicate the timing difference between an RP 106 oscillator and a neighboring base station 118 oscillator. An initial phase error (between the baseband controller and an NTP grandmaster clock) may then be estimated as delta1+delta2.

REM-Based Solution Details

Figure 2A:
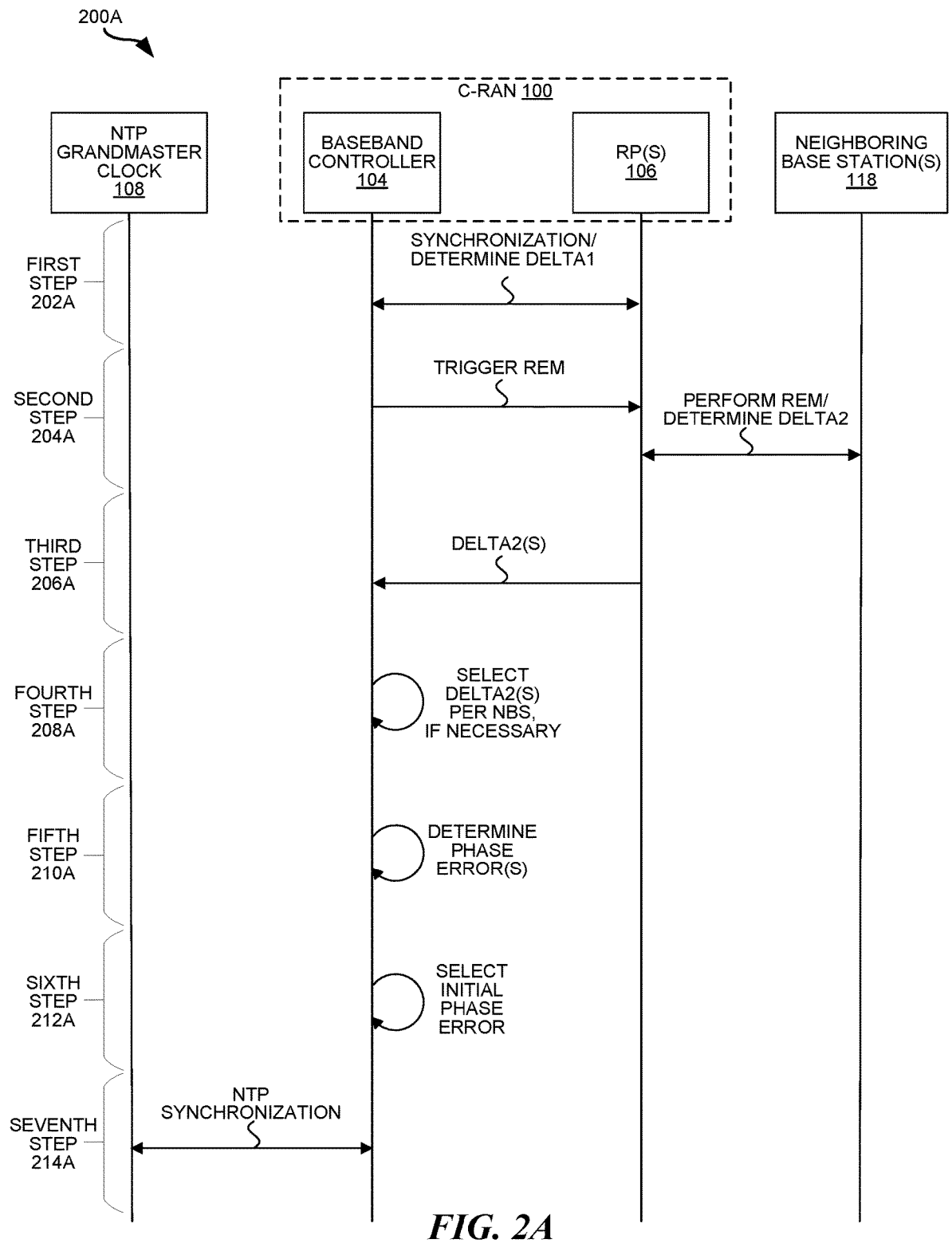
FIG. 2A is a sequence diagram illustrating an example of synchronizing a C-RAN to an NTP grandmaster clock using REM-based synchronization.

FIG. 2A is a sequence diagram illustrating an example of synchronizing a C-RAN 100 to an NTP grandmaster clock 108 using REM-based synchronization 200A. FIG. 2A illustrates the steps that may be performed during the REM-based synchronization 200A. However, it is understood, that not all of the steps (or sub-steps within a step) illustrated in FIG. 2A must be performed in order to synchronize C-RAN 100 to an NTP grandmaster clock 108. Furthermore, in some configurations, the steps (or sub-steps) may be performed in a different order than that illustrated in FIG. 2A.

As before, the C-RAN 100 may include a baseband controller 104 and at least one RP 106. In some configurations, the C-RAN 100 may include more than one RP 106, each of which may perform REM. Similarly, in some configurations, the REM performed in a particular RP 106 may monitor the downlink signals (described below) of more than one neighboring base station 118. The REM-based synchronization 200A may include a series of messages and/or processes between the NTP grandmaster clock 108, the baseband controller 104, the RP 106, and a neighboring base station 118. Each of the baseband controller 104, the RP 106, a neighboring base station 118, and NTP grandmaster clock 108 include at least one oscillator.

The REM-based synchronization 200A may be initialized in response to the baseband controller 104 being powered up and/or brought online (e.g., following reconfiguration, installation, repair, etc.). In some configurations, the REM-based synchronization 200A may be initialized in response to user input at the baseband controller 104 and/or a device management system (not shown) communicatively coupled to the baseband controller 104.

In a first step 202A, the clock in at least one (e.g., all) RP 106 may be synchronized (e.g., using IEEE 1588) with the baseband controller 104 oscillator. This synchronization may be triggered (e.g., requested) by the baseband controller 104 without first waiting for the baseband controller 104 oscillator to lock to an NTP grandmaster clock 108 (since that is a relatively slow process to perform without first having an accurate initial phase estimate).

Figure 3:
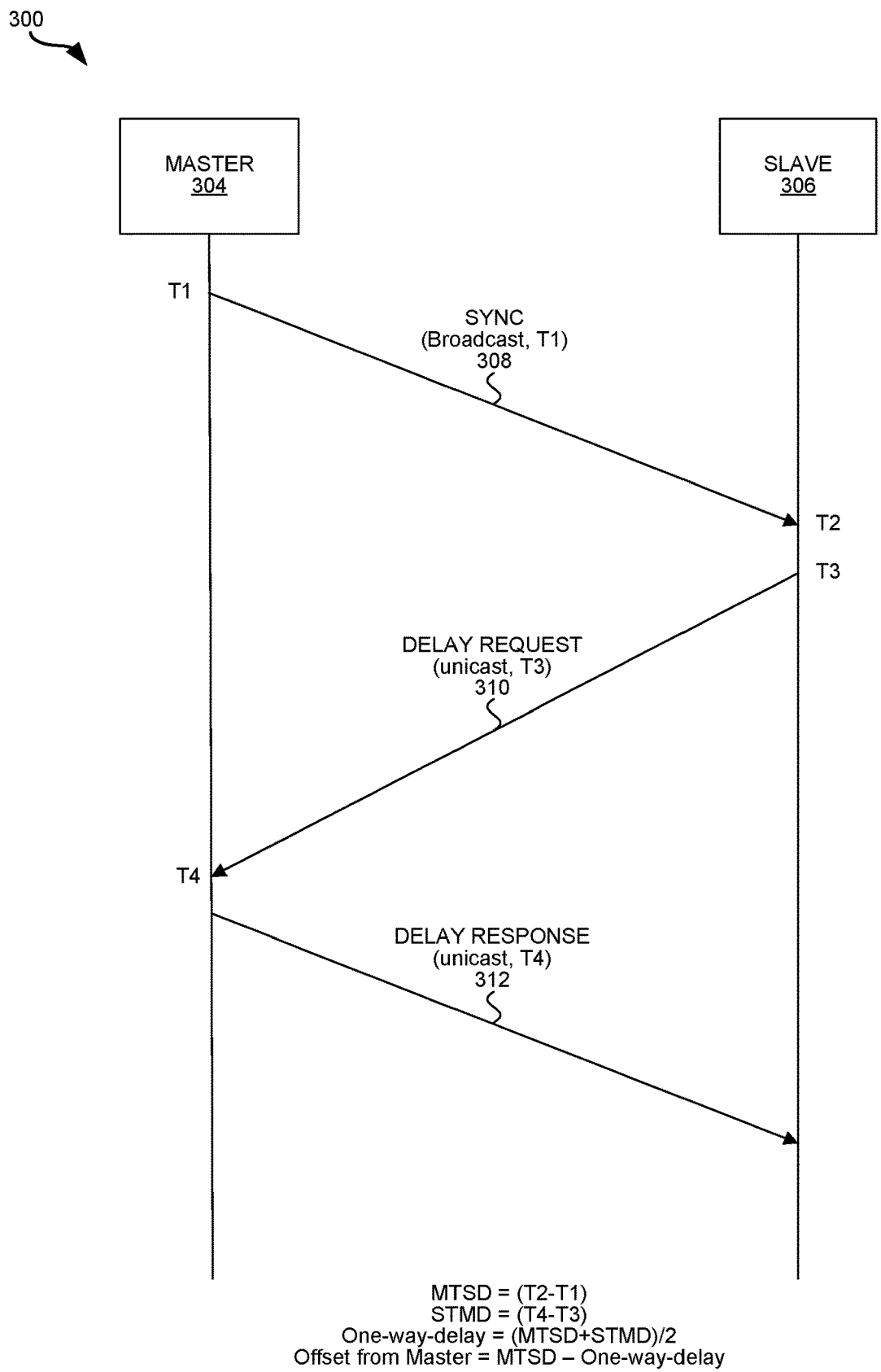
FIG. 3 is a sequence diagram illustrating a master device synchronizing with a slave device using IEEE 1588.

FIG. 3 is a sequence diagram 300 illustrating a master device 304 synchronizing with a slave device 306 using Institute of Electrical and Electronics Engineers (IEEE), standard number 1588 (referred to as "IEEE 1588"). The sequence diagram 300 in FIG. 3 is an example implementation of the first step 202A of the sequence diagram 200A in FIG. 2A. IEEE 1588 uses round-trip messaging during which messages are communicated between a master device 304 (e.g., the baseband controller 104) and a slave device 306 (e.g., an RP 106). The master 304 and the slave 306 each include at least one oscillator. In some configurations, the IEEE 1588 procedure may be performed between the baseband controller 104 and all RPs 106 (or all RPs 106 that have not previously been synchronized to the baseband controller 104) in a C-RAN 100.

IEEE 1588 is a time-stamping protocol, implemented over the User Datagram Protocol (UDP)/Internet Protocol (IP), between a master clock in the baseband controller 104 and a slave clock in an RP 106. The IEEE 1588 protocol involves repeated round-trip exchanges between the master 304 and slave 306 clocks, where each series of such exchanges produces a timing update signal that can be used to iteratively correct the timing reference signal in the RP 106.

Typically, IEEE 1588 synchronization has three phases: estimation, coasting, and LOCK. As mentioned above, IEEE 1588 can be further simplified by the baseband controller 104 (master 304) not initiating synchronization with the NTP grandmaster clock 108 using the above phases in order to LOCK its clock to the NTP grandmaster clock 108 during the bring-up process (Plug-and-Play).

Instead, the estimation phase of IEEE 1588 synchronization is performed (to estimate delta1) between each RP 106 and the baseband controller 104. During the estimation phase (e.g., on C-RAN 100 boot-up), the baseband controller 104 will assume its clock as the master 304 and initiate PERIODIC SYNC packets 308 (sent at time T1, received at time T2) to the RPs 106 (slaves 306). The slaves 306 will respond back with DELAY REQUEST packets 310 (sent by the slave 306 at time T3, received at the master 304 at time T4), after which the master 304 will respond with DELAY RESPONSE packets 312 (received at the slave 306).

At the end of a series of such exchanges that will mark the end of this estimation phase (e.g., which takes around a minute), the slave 306 will have the average Master-To-Slave Delay (MTSD), determined as T2−T1, and average Slave-to-Master Delay (STMD), determined as T4−T3, from which it can determine the network one-way-delay as (MTSD+STMD)/2. From this, the timing difference (also referred to as a phase delay variation (PDV)) of the slave 306 (e.g., RP 106) clock from the master 304 (e.g., baseband controller 104) clock can be determined by the slave 306 (e.g., RP 106) as: MTSD minus one-way-delay. Thus, the slave 306 (e.g., RP 106) clock is synchronized/LOCKED with the master 304 (e.g., baseband controller 104) clock in this manner. This residual timing difference between the slave 306 (e.g., RP 106) clock and the master 304 (e.g., baseband controller 104) clock may be referred to herein as "delta1," which may or may not be transmitted to the baseband controller 104.

In some configurations, the estimation phase of IEEE 1588 synchronization is performed to estimate delta1, as described in the preceding two paragraphs, e.g., without the coasting phase and LOCK phase of IEEE 1588 synchronization. However, the delta1 estimated using the estimation phase alone could be relatively large, in which case the RP 106 may correct for this error and re-compute the estimation and correction for a few iterations (called the coasting phase) until the deta1 measured becomes smaller, e.g., less than 300 nsec. Once delta1 is within a certain threshold, the estimation-correction loop terminates and the RP 106 is said to be LOCKED to the baseband controller 104. In this case, the delta1 is less than some threshold, e.g., 300 nsec. For example, the delta1 values reported by all the RPs 106 that have achieved LOCK in this manner will be less than 300 nsec PDV. When the delta1 is within a threshold (e.g., 300 nsec), the delta1 may or may not be transmitted to the baseband controller 104 (since it is very small).

In summary, there are at least two methods to find delta1 for a particular RP 106: (1) using only the estimation phase of the 1588 IEEE synchronization between baseband controller 104 and the particular RP 106; and (2) using the estimation phase, coasting phase, and LOCK phase of the complete IEEE 1588 synchronization.

In some configurations, since all the RPs 106 in a C-RAN 100 are synchronized to the baseband controller 104, a single delta1 value may be used for all the RPs 106, e.g., since the various timing differences for different RPs 106 are likely to be very close (on the order of nanoseconds) to each other. In other configurations, a different timing difference (delta1) value may be determined for every RP 106 in the C-RAN 100.

IEEE 1588 is also referred to as Precision Time Protocol (PTP), and may refer to the 2002 version (PTP) or the 2008 revision (PTP v2). Furthermore, other high precision timing protocols may be used instead of or in addition to IEEE 1588.

Referring again to the sequence diagram 200A of FIG. 2A, in a second step 204A, the baseband controller 104 will trigger a radio environment monitoring (REM) procedure in an RP 106 (and optionally more than one RP 106) in the C-RAN 100. REM is a non-real-time process, during which an RP 106 listens to existing downlink transmissions of neighboring base station(s) 118 (macro and/or small cell(s)) and synchronizes it's clock to a neighboring base station 118. As a result of synchronizing with a neighboring base station 118, an RP 106 may determine a timing error (delta2) between the RP 106 oscillator and the neighboring base station 118 oscillator. The RP 106 may send this timing error (delta2) to the baseband controller 104 (e.g., on an existing interface between RP 106 and baseband controller 104), e.g., so the baseband controller 104 can determine a phase error between the baseband controller 104 and each monitored neighboring base station 118 (in subsequent steps). Alternatively, the RP 106 may use a timing error (delta2, derived from a frequency error), along with a timing difference (delta1), to determine a phase error.

Downlink receiving devices (e.g., RPs 106) may store a buffered set of I/Q samples for a set of subframes, and then decode the synchronization channels that it receives with good power from neighboring base stations 118 (e.g., macro cells and/or small cells). Typical downlink synchronization (e.g., performed by a UE 110) includes the following steps:

(1) frequency synchronization (also referred to as carrier frequency offset (CFO) estimation) using the Primary Synchronization Signal (PSS) of the neighbor base station 118; (2) slot synchronization (referred to as PSS synchronization); (3) frame synchronization and Physical Cell ID (PCI) detection (referred to as Secondary Synchronization Signal (SSS) synchronization); and optionally (4) fine frequency estimation (referred to as Cell Specific Reference Signal (CS-RS) synchronization).

The REM procedure, in which the RP 106 listens to downlink signals of at least one neighboring base station 118, may use similar sub-steps (as the typical downlink synchronization performed by a UE 110) to synchronize to the neighboring base station(s) 118. The REM procedure at a particular RP 106 may produce an accurate timing error between the particular RP 106 and each neighboring base station 118 monitored during REM. For example, the REM procedure (performed at the RP 106) may estimate a frequency error using a Primary Synchronization Signal (PSS), a Secondary Synchronization Signal (SSS), and, optionally, a Cell Specific Reference Signal (CS-RS) of a neighboring base station 118, e.g., via a cyclic prefix based phase-difference detection methods. The frequency error (e.g., in Hz) may then be converted to a timing error (delta2, e.g., in units of milliseconds or nanoseconds).

Because the RP 106 uses a correlation-based PSS detection scheme, the PSS will be received (from the neighboring base station 118) with lower power than if the RP 106 was already synchronized with the neighboring base station 118. Specifically, in a correlation based scheme, if the frequency error is high, the correlation peak in the detected signal will be lower.

Accordingly, in a first REM sub-step, the RP 106 may perform coarse carrier-frequency offset (CFO) estimation using the Primary Synchronization Signal (PSS) transmitted by the neighboring base station 118. CFO estimation is an iterative process within the RP 106 and may be performed using cyclic prefix (CP) based fractional frequency offset (FFO) estimation method(s), e.g., maximum likelihood (ML) estimation, best linear unbiased estimation (BLUE), etc. Therefore, the RP 106 can estimate the CFO using the received PSS from the neighboring base station 118.

In some configurations, FFO may be performed as follows. The amount of FFO can be found from the PSS OFDM symbol by the multiplication of the conjugate of the Cyclic-Prefix duration of the PSS OFDM symbol with the corresponding CP in the OFDM PSS symbol. This gives the phase-estimate from which the frequency error (and timing error) can be derived. In order to reduce the effect of noise, the average can be taken over the samples in the CP interval or the above operation repeated over a few PSS symbols and then the Maximum Likelihood estimate can be computed.

In a second REM sub-step, PSS synchronization may use multiple iterations of correlation-based PSS detection, e.g., to obtain the slot boundary (also referred to as slot synchronization). Each PSS includes one of three different 62-symbol Zadoff-chu sequences for a cell, each of the three sequences associated with a set of 168 of 504 possible Physical Cell IDs (PCIs). The PSS may be broadcast twice during every radio frame in LTE with both transmissions being identical. The PCI is formed partially from the PSS sequence (along with the SSS sequence) and may be transmitted from a neighbor base station 118 in the RP's vicinity. Therefore, the PCI of the neighboring base station 118 may be partially determined from the PSS.

The PSS sequences used in LTE inherently provide high PSS correlation and good detection over a wide frequency error range of +/−7.5 KHz. This translates to about 10 ppm, which is a wide range of synchronization lock for an unsynchronized UE 110 or RP 106 to capture. The signal-to-noise ratio (SNR) or correlation amplitude/power of PSS detection can be improved with reduced frequency error.

In the first iteration of PSS detection, the PSS will be detected using CP-based FFO estimation (e.g., ML estimation, BLUE, etc.), and a frequency error determined. The frequency error may be the CFO plus a fine frequency error. Then, the incoming I/Q samples can be corrected for the frequency error (e.g., using I/Q derotation), after which a second iteration of PSS correlation detection can be carried out. The estimated frequency error will be even more accurate following the second iteration than following the first iteration. After a few more iterations of PSS detection, the estimated frequency error will be very accurate. This iterative process can be achieved in the RP 106 using hardware I/Q derotation or software I/Q derotation. In other words, the I/Q derotation described below, whether performed in hardware or software, may be used to correct for the frequency error following each iteration of PSS detection.

Figure 4:
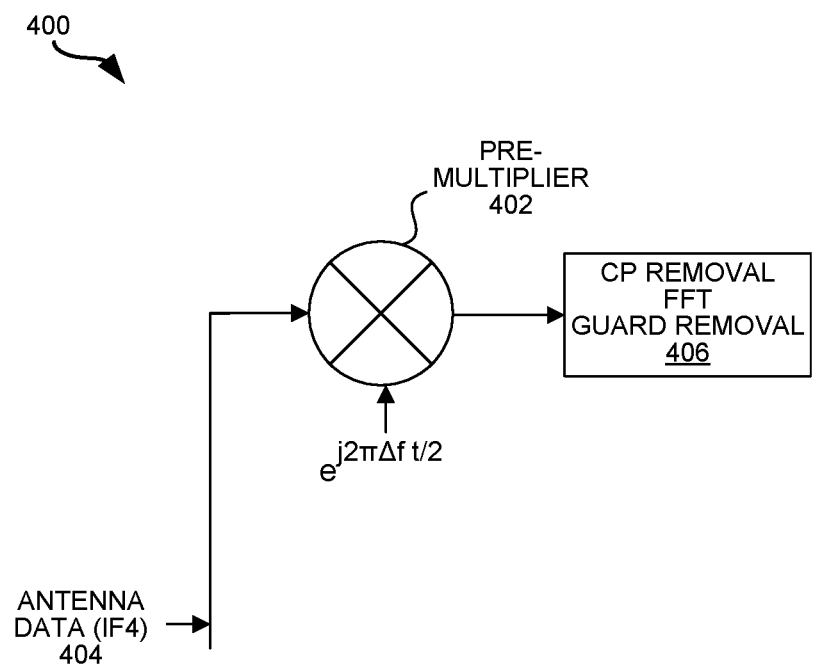
FIG. 4 is a block diagram illustrating circuitry for performing hardware I/Q derotation.

FIG. 4 is a block diagram illustrating circuitry 400 for performing hardware I/Q derotation. In some configurations, the circuitry 400 performs Physical Uplink FFT (PUFFT) as part of Fast Fourier Transform (FFT) operations in the front-end of REM downlink receiver processing. The circuitry 400 includes a pre-multiplier 402 which, in some configurations, is not otherwise used. In the present systems and methods, however, the circuitry 400 may be used for hardware I/Q derotation.

In LTE uplink, the eNodeB is a receiver, and LTE uplink transmissions are offset by a carrier frequency offset (CFO), such as 7.5 kHz, e.g., the 0th subcarrier is offset from the DC subcarrier frequency by 7.5 kHz; the 1st subcarrier is offset from DC subcarrier by 22.5 kHz, etc. One purpose of the circuitry 400, therefore, is to remove the 7.5 KHz frequency offset inherent in LTE uplink by rotating the received I/Q input samples by the fixed offset. In the figure, antenna data 404 is going into a mixer (implementing the pre-multiplier 402) that is mixed with an offset of $\Delta_f$ (e.g., −7.5 kHz). Following carrier offset removal, the cyclic prefix may be removed, FFT performed, and the guard period removed 406.

However, in LTE downlink reception (which is what the RP 106 receives from the neighboring base station 118 during REM), this frequency ($\Delta_f$, e.g., −7.5 kHz) correction is not necessary because LTE downlink subcarriers are sent on the DC subcarrier, and multiples of 15 KHz subcarriers without any offset, as per LTE downlink specifications. Because the RP 106 is not synchronized to the neighboring base station 118, the pre-multiplier 402 (e.g., mixer) may be configured (e.g., writing a digital value to the digital synthesizer) with the frequency error CFO (that corresponds to the frequency offset $\Delta_f$) determined during the most recent iteration of PSS detection. In other words, the pre-multiplier 402 (e.g., mixer) can be configured to correct the estimated frequency offset in downlink signals received by the RP 106 during REM (from the neighboring base station 118). Correcting for the frequency offset may iteratively reduce the frequency error and thus improve the SINR and detection probability at the RP 106. The advantage of hardware I/Q de-rotation (compared to software I/Q derotation) is that it is extremely fast and uses less processing resources. After the pre-multiplier 402 (e.g., mixer) is configured to correct the estimated frequency offset, the circuitry 400 may provide I/Q samples that are frequency-corrected.

Since REM works on buffered I/Q samples of a few subframes and is a not performed in real time, the I/Q samples could alternatively be derotated in software using the frequency error estimate and stored back in place in the buffer. Thus, the SNR, detection and frequency error could be iteratively obtained as explained above in connection with hardware I/Q derotation. Since the baseband controller 104 and RP 106 are not communicating during REM scan, the added delay associated with software I/Q de-rotation is not a problem.

Although PSS detection may produce an accurate estimate of the frequency error, an SSS synchronization sub-step and, optionally, a CS-RS synchronization sub-step may be performed after PSS detection is at the correlation peak after I/Q derotation.

During a third REM sub-step, Secondary Synchronization Signal (SSS) synchronization using a correlation-based procedure (e.g., ML estimation, BLUE, etc.) may be performed by the RP 106 (or UE 110) to detect the SSS transmitted by the neighboring base station 118, e.g., to obtain 10 ms frame timing detection (also referred to as frame synchronization) and PCI detection. Each SSS is one of 168 different 62-symbol Zadoff-chu sequences associated with the PSS sequence used by the neighboring base station 118. The SSS may be broadcast twice during every radio frame in LTE with the transmissions being different so the RP 106 (or UE 110) can detect which one is first and which one is second. The PCI can be determined from both the PSS and the SSS.

Cell Specific Reference Signal (CS-RS) synchronization may be performed (using the detected radio frame boundaries) to obtain RSRP/RSRQ cell measurements (and decode other downlink channels). During an optional fourth REM sub-step, fine-frequency estimation may also be performed during CS-RS synchronization. e.g., using correlation-based estimation, such as ML or BLUE. During CS-RS synchronization, a more accurate frequency error estimate can be obtained since the CS-RS sequence is a larger bandwidth sequence compared to PSS sequence (300 sub-carriers for 20 Mhz CS-RS compared 62 sub-carrier PSS sequence, where both PSS and CS-RS are Zadoff-Chu sequences). Specifically, the frequency error is more accurate following CS-RS synchronization because it accounts for a fine frequency error that is only estimated using the CS-RS sequence.

As mentioned above, the frequency error estimation as part of CS-RS synchronization is optional. If fine-frequency estimation is not performed as part of CS-RS synchronization, the frequency error resulting from PSS synchronization (without accounting for the fine frequency error) may be used as frequency error. As a result of CS-RS synchronization, the correlation peak in the detected signals from the neighboring base station 118 will be higher than without CS-RS synchronization. In some configurations, PSS synchronization provides an accuracy of about 1,000 ppb and CS-RS synchronization will provide accuracy of less than 100 ppb.

Referring again to the sequence diagram 200A of FIG. 2A, the second step 204A produces at least one frequency error, e.g., as a result of the iterative PSS synchronization and optional CS-RS synchronization. Each frequency error (e.g., in units of Hz) indicates the frequency error of an RP 106 clock with respect to a neighboring base station 118, and may be converted to a timing error in units of time (and referred to as delta2). Since this frequency error estimation and correction is purely based on I/Q derotation, the conventional, iterative process of crystal disciplining to reduce frequency error is not necessary. Thus, the effects of temperature and linearity of digital-to-analog converter (DAC) driving the crystal that otherwise affect clock synchronization are not relevant. In other words, doing derotation with a pre-multiplier 402 does not require accounting for temperature-dependent effects and non-linearities of oscillators.

In a third step 206A, the timing error(s) (delta2 value(s)) may be transmitted from the RP(s) 106 to the baseband controller 104. For example, each RP 106 may transmit a different timing errors (delta2) for each neighboring base station 118 that it monitors during REM. This transmission (or transmissions) may occur on an existing CU-RP interface. For example, an attribute may be added to existing signal power messaging (for RSRP ranking at the baseband controller 104) sent from the RP 106 to the baseband controller 104.

In a fourth step 208A, the baseband controller 104 may select a timing error (delta2) for each neighboring base station 118, if necessary. REM may be performed by more than one RP 106, each potentially monitoring more than one neighboring base station 118. Therefore, the same neighboring base station 118 may be monitored by more than one RP 106, resulting in more than one delta2 value for a single neighboring base station 118. Accordingly, if multiple delta2 values are received for the same neighboring base station 118, the baseband controller 104 may select the delta2 value that was sent from the RP 106 that detected the neighboring base station 118 (e.g., via it's PCI) with the highest strength, e.g., RSRP.

Alternatively, the baseband controller 104 may average multiple delta2 values (e.g., measured by different RPs 106) for the same neighboring base station 118 to produce a single delta2. In some configurations, only the delta2 values (for the same neighboring base station 118), which were determined by RPs 106 that detected the neighboring base station 118 with RSRP values that are within a certain percentile, are averaged, e.g., only delta2 values from RPs 106 that detected the neighboring base station 118 with RSRPs in the 90th percentile (of all RPs 106 that detected the neighboring base station 118) are considered in the average. In other words, in some configurations, only the delta2 values for a particular neighboring base station 118 received with a strongest X % may be averaged, e.g., the strongest 10%. In some configurations, multiple delta2 values (e.g., measured by different RPs 106) for the same neighboring base station 118 are averaged only if the estimation phase, coasting phase, and LOCK phase of the complete IEEE 1588 synchronization are used, as discussed above. Alternatively, if the baseband controller 104 receives only a single timing error (delta2) for a particular neighboring base station 118, the selection in the fourth step 208A is not necessary.

In a fifth step 210A, the baseband controller 104 may determine, using the delta2 values received in the fourth step 208A, a phase error of the baseband controller 104 oscillator with respect to each neighboring base station 118 for which REM has been performed. Each phase error may be determined as the sum of delta1 (the timing difference (delta1) between the RP 106 and the baseband controller 104, determined in the first step 202A) and the delta2 (the timing error between the RP 106 and the respective neighboring base station 118, determined in the second step 204A). Alternatively, the RP(s) 106 may use the delta1 and delta2 values to determines the phase error(s).

In a sixth step 212A, the baseband controller 104 may select one of the phase errors received from an RP 106. As stated above, REM may be performed by more than one RP 106, each potentially monitoring more than one neighboring base station 118. Accordingly, it is desirable to verify that the phase error used as the initial phase error (for NTP synchronization below) is a macro cell, not a small cell that may not be synchronized to a stable universal reference clock.

To do this, the baseband controller 104 may select a phase error reported from the RP REM that has the strongest Reference Signal Received Power (RSRP) reported for a PCI that the operator has already indicated is a macro cell (outside the C-RAN 100), e.g., using a device management system (DMS) before C-RAN 100 initialization. For example, the baseband controller 104 may (1) identify the PCI of the strongest reported neighboring base station 118 that is a macro cell and (2) select a phase error or average phase error (associated with the neighboring base station 118 having the identified PCI), as the initial phase error for NTP synchronization. This may ensure that the selected phase error is based on a trusted source and not a uncontrolled standard source.

Alternatively, the baseband controller 104 may select a phase error associated with the PCI of the neighboring base station 118 having the highest RSRP measured at any RP 106 during its REM, i.e., without regard for whether the neighboring base station 118 has previously been indicated as being a macro cell.

In a seventh step 214A, the baseband controller 104 may use the selected phase error as the initial phase error value to perform NTP synchronization with the NTP grandmaster clock 108. In other words, the baseband controller 104 may use the selected phase error (from the sixth step 212A) to estimate and correct the relative frequency error of its oscillator with respect to the NTP grandmaster clock 108.

The NTP synchronization procedure may use a Kalman filter, which takes a relatively long time (e.g., more than 10 minutes) in the absence of an initial phase-estimate. Using the initial phase-estimate as described herein will enable Kalman filter to perform efficient multi-variate optimization and converge quicker to the required accuracy of less than 30 ppb relative phase between baseband controller 104 oscillator (e.g., as part of a phase-locked loop (PLL)) and the NTP grandmaster clock 108.

After the baseband controller 104 synchronizes to the NTP grandmaster clock 108, the baseband controller 104 will move its state to LOCK and inform the RPs 106 in the C-RAN 100 to start IEEE 1588 synchronization. At that time, the RPs 106 will synchronize to the now-NTP-synchronized baseband controller 104 oscillator. Then, the C-RAN 100 is considered fully initialized and may begin normal operation, e.g., providing wireless service to UEs 110.

Figure 2B:
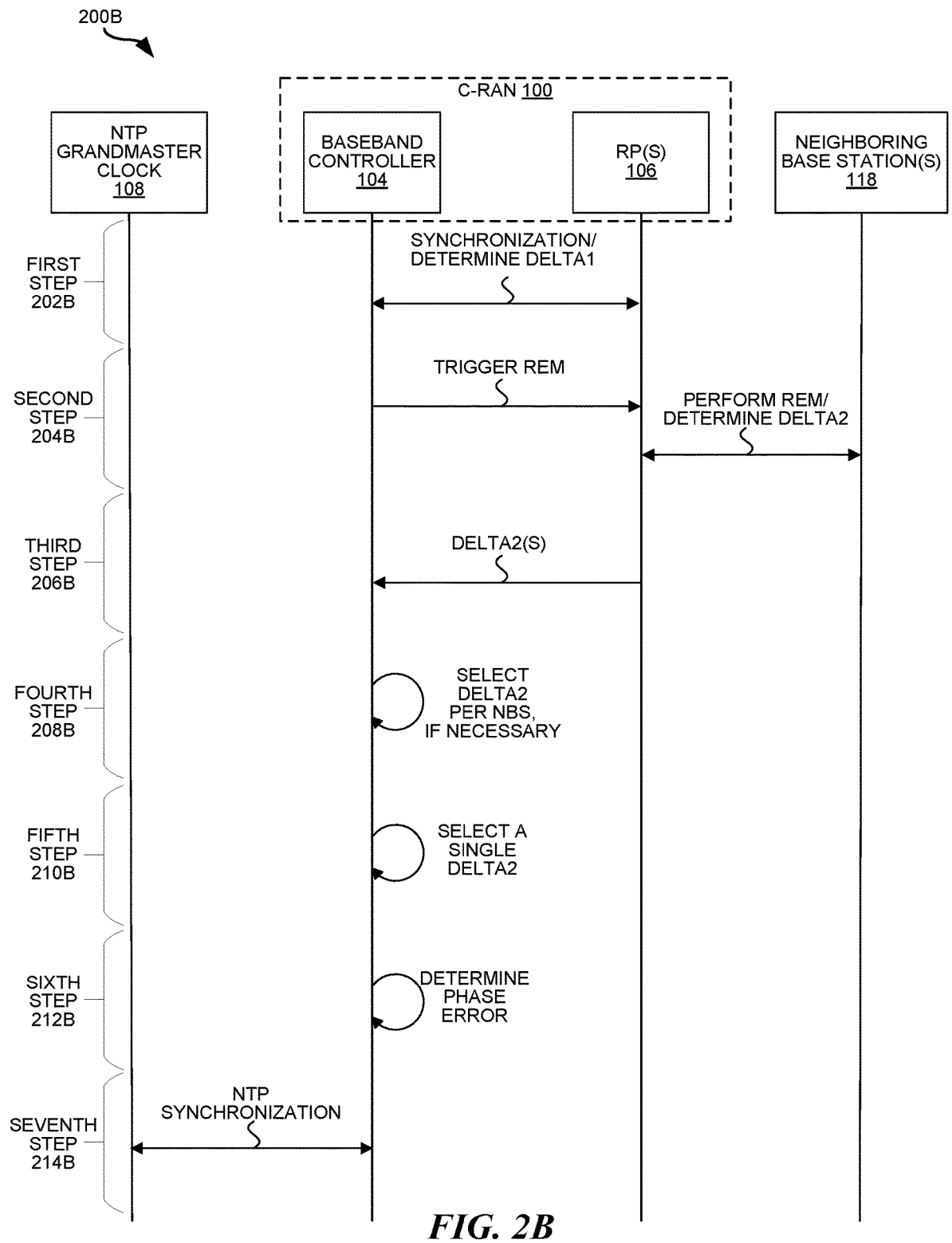
FIG. 2B is a sequence diagram illustrating another example of synchronizing a C-RAN to an NTP grandmaster clock using REM-based synchronization.

FIG. 2B is a sequence diagram illustrating another example of synchronizing a C-RAN 100 to an NTP grandmaster clock 108 using REM-based synchronization 200B. FIG. 2B illustrates the steps that may be performed during the REM-based synchronization 200B. However, it is understood, that not all of the steps (or sub-steps within a step) illustrated in FIG. 2B must be performed in order to synchronize C-RAN 100 to an NTP grandmaster clock 108. Furthermore, in some configurations, the steps (or sub-steps) may be performed in a different order than that illustrated in FIG. 2B.

The first step 202B, second step 204B, third step 206B, fourth step 208B, and seventh step 214B in FIG. 2B may be performed in a similar manner to the first step 202A, second step 204A, third step 206A, fourth step 208A, and seventh step 214A, respectively, in FIG. 2A. In the fifth step 210B, the baseband controller 104 may select a single delta2 from all delta2 values it receives, e.g., from multiple RPs 106 and/or for multiple neighboring base stations 118. In some configurations, baseband controller 104 may select the delta2 associated with a neighboring base station 118 that was (1) determined to be a macro base station; and (2) received/detected with the highest RSRP amongst all neighboring base stations 118 (that are macro base stations) detected by all RPs 106.

Alternatively, the baseband controller 104 may select a single delta2 value by averaging a group of delta2 values it received from the RPs 106. In one example, the baseband controller 104 may rank the RSRP with which each neighboring base station 118 is received by any RP 106. The baseband controller 104 may then average the delta2 values associated with the Nth (e.g., 90th) percentile of reported RSRP values. This average may be used as the single delta2 value.

In the sixth step 212B, the baseband controller 104 may determine a phase error as the sum of delta1 (the timing difference (delta1) between the RP 106 and the baseband controller 104 and the single delta2 (selected in the fifth step 210B).

Figure 5A:
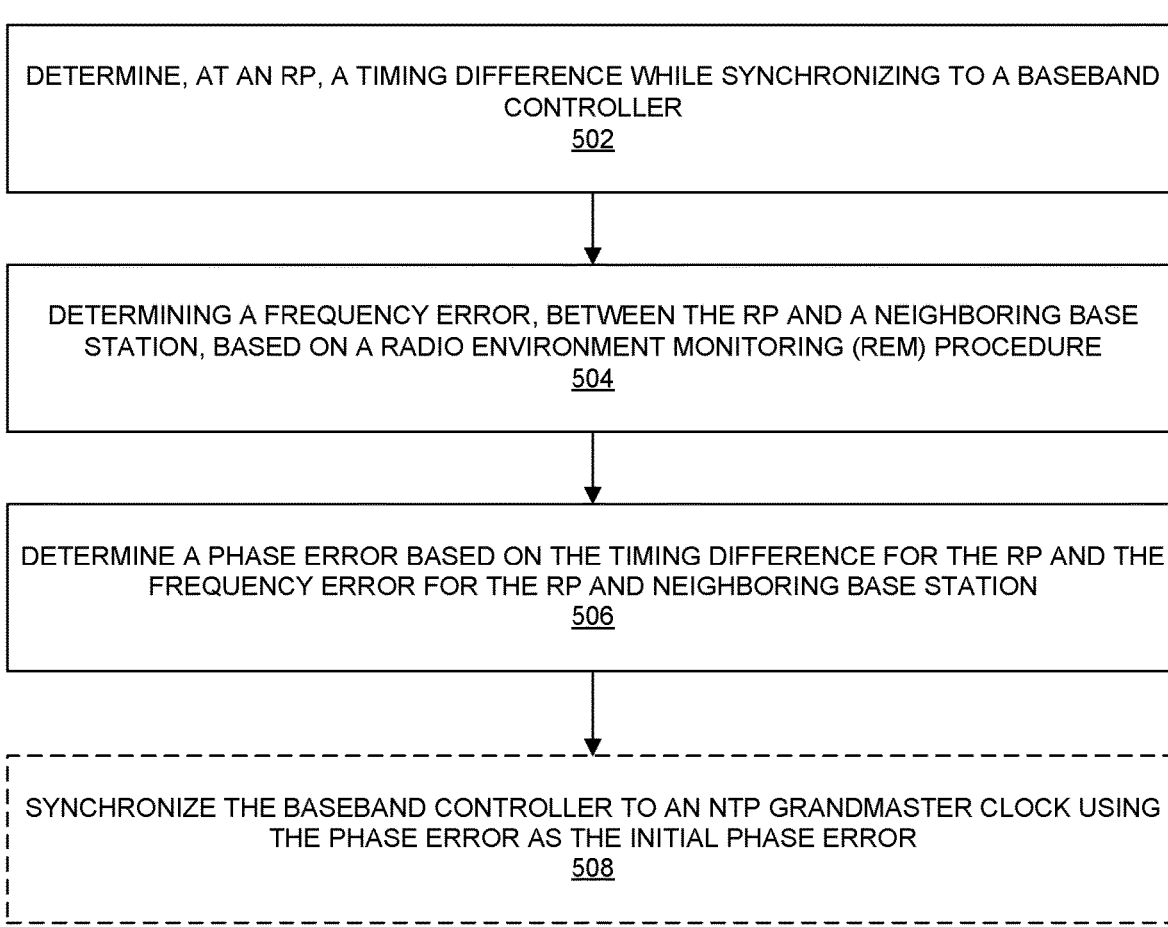
FIG. 5A is a flow diagram illustrating an example method for synchronizing a C-RAN to an NTP reference (grandmaster) clock.

FIG. 5A is a flow diagram illustrating an example method 500A for synchronizing a C-RAN 100 to an NTP reference (grandmaster) clock 108. The method 500A may be performed by at least a baseband controller 104 and at least one RP 106, together forming at least a portion of a C-RAN 100 that provides wireless service to UEs 110. The method 500A may further include steps involving the NTP grandmaster clock 108 and/or at least one neighboring base station 118. Each of the baseband controller 104, the RP(s) 106, a neighboring base station 118, and the grandmaster clock 108 include at least one oscillator. While the method 500A is generally described using a single RP 106 and a single neighboring base station 118, it is understood that some steps may be performed for more than one RP 106 and/or more than one neighboring base station 118.

The blocks of the flow diagram shown in FIG. 5A have been arranged in a generally sequential manner for ease of explanation; however, it is to be understood that this arrangement is merely exemplary, and it should be recognized that the processing associated with method 500A (and the blocks shown in FIG. 5A) can occur in a different order (for example, where at least some of the processing associated with the blocks is performed in parallel and/or in an event-driven manner). Also, most standard exception handling is not described for ease of explanation; however, it is to be understood that method 500A can and typically would include such exception handling.

The method 500A may begin at step 502 where an RP 106 determines a timing difference (between it and the baseband controller 104) while synchronizing to the baseband controller 104. This synchronization may include using an IEEE 1588 procedure between the baseband controller 104 and the RP 106 without first synchronizing the baseband controller 104 oscillator to the NTP grandmaster clock 118 (or any other universal reference clock).

In some configurations, only the estimation phase of IEEE 1588 synchronization is used (to determine a delta1 for the RP 106). In these configurations, the baseband controller 104 (acting as a master 304) will send PERIODIC SYNC packets 308 to the RP 106 acting as a slave 306 (the PERIODIC SYNC packets are sent by the baseband controller 104 at time T1, received by the RP 106 at time T2). The RP 106 then responds back with DELAY REQUEST packets 310 (sent by the RP 106 at time T3, received by the baseband controller 104 at time T4), after which the baseband controller 104 responds with DELAY RESPONSE packets 312 (carrying the time T4 to inform the RP 106).

Following this process, the RP 106 will have the average Master-To-Slave Delay (MTSD), determined as T2–T1, and average Slave-to-Master Delay (STMD), determined as T4–T3, from which it can determine the network one-way-delay as (MTSD+STMD)/2. From this, the phase delay variation (PDV) of the RP 106 oscillator from the baseband controller 104 oscillator can be determined as: MTSD—one-way-delay, referred to herein as "delta1," which may or may not be transmitted to the baseband controller 104.

In other configurations, the delta1 estimated using the estimation phase alone could be relatively large, in which case the RP 106 may correct for this error and re-compute the estimation and correction for a few iterations (called the coasting phase) until the deta1 measured becomes smaller, e.g., less than 300 nsec. Once delta1 is within a certain threshold, the estimation-correction loop terminates and the RP 106 is said to be LOCKED to the baseband controller 104. In this case, the delta1 is less than some threshold, e.g., 300 nsec. For example, the delta1 values reported by all the RPs 106 that have achieved LOCK in this manner will be less than 300 nsec PDV. When the delta1 is within a threshold (e.g., 300 nsec), the delta1 may or may not be transmitted to the baseband controller 104 (since it is very small).

Furthermore, in some configurations, a single delta1 value may be used for every RP 106. Alternatively, a different delta1 value may be determined for each RP 106.

The method 500A may proceed at step 504 where the RP 106 determines a timing error, between the RP 106 and a neighboring base station 118, based on a radio environment monitoring (REM) procedure. During the REM procedure, the RP 106 may monitor downlink signals transmitted by the neighboring base station 118. The REM in the RP 106 may be triggered using a message transmitted by the baseband controller 104.

As described above, the RP 106 may perform the following steps (during REM) with respect to the neighboring base station 118: (1) frequency synchronization (also referred to as carrier frequency offset (CFO) estimation) using the Primary Synchronization Signal (PSS) of the neighbor base station 118; (2) slot synchronization (referred to as PSS synchronization); (3) frame synchronization/PCI detection (referred to as Secondary Synchronization Signal (SSS) synchronization); and optionally (4) fine frequency estimation (referred to as Cell Specific Reference Signal (CS-RS) synchronization). The REM performed at the RP 106 may produce a frequency error, which is converted to a timing error (referred to as "delta2"), for the neighboring base station 118.

The method 500A may proceed at step 506 where a phase error is determined based on the timing difference (delta1) from step 502 and the timing error (delta2) from step 504. The phase error may approximate the error between the baseband controller 104 and a universal, stable reference clock (e.g., that the neighboring base station 118, monitored by an RP 106, is synchronized to). The phase error may be determined as the sum of the timing difference (delta1, determined in step 502) and the timing error (delta2, determined in step 504). The phase error may be determined at the baseband controller 104 (using a timing difference (delta1) and timing error (delta2) received from the RP 106) or at the RP 106 (using a timing difference (delta1) and timing error (delta2) determined at the RP 106).

The method 500A may proceed at optional step 508 where the baseband controller 104 synchronizes to an NTP grandmaster clock 108 using the phase error as the initial phase error. In other words, the baseband controller 104 may use the selected phase error to estimate and correct the relative frequency error of its oscillator with respect to the NTP grandmaster clock 108.

The NTP synchronization procedure may use a Kalman filter, which takes a relatively long time (e.g., more than 10 minutes) in the absence of an initial phase-estimate. Using the initial phase-estimate as described herein will enable Kalman filter to perform efficient multi-variate optimization and converge quicker to the required accuracy of less than 30 ppb relative phase between baseband controller 104 oscillator (e.g., as part of a phase-locked loop (PLL)) and the NTP grandmaster clock 108.

Figure 5B:
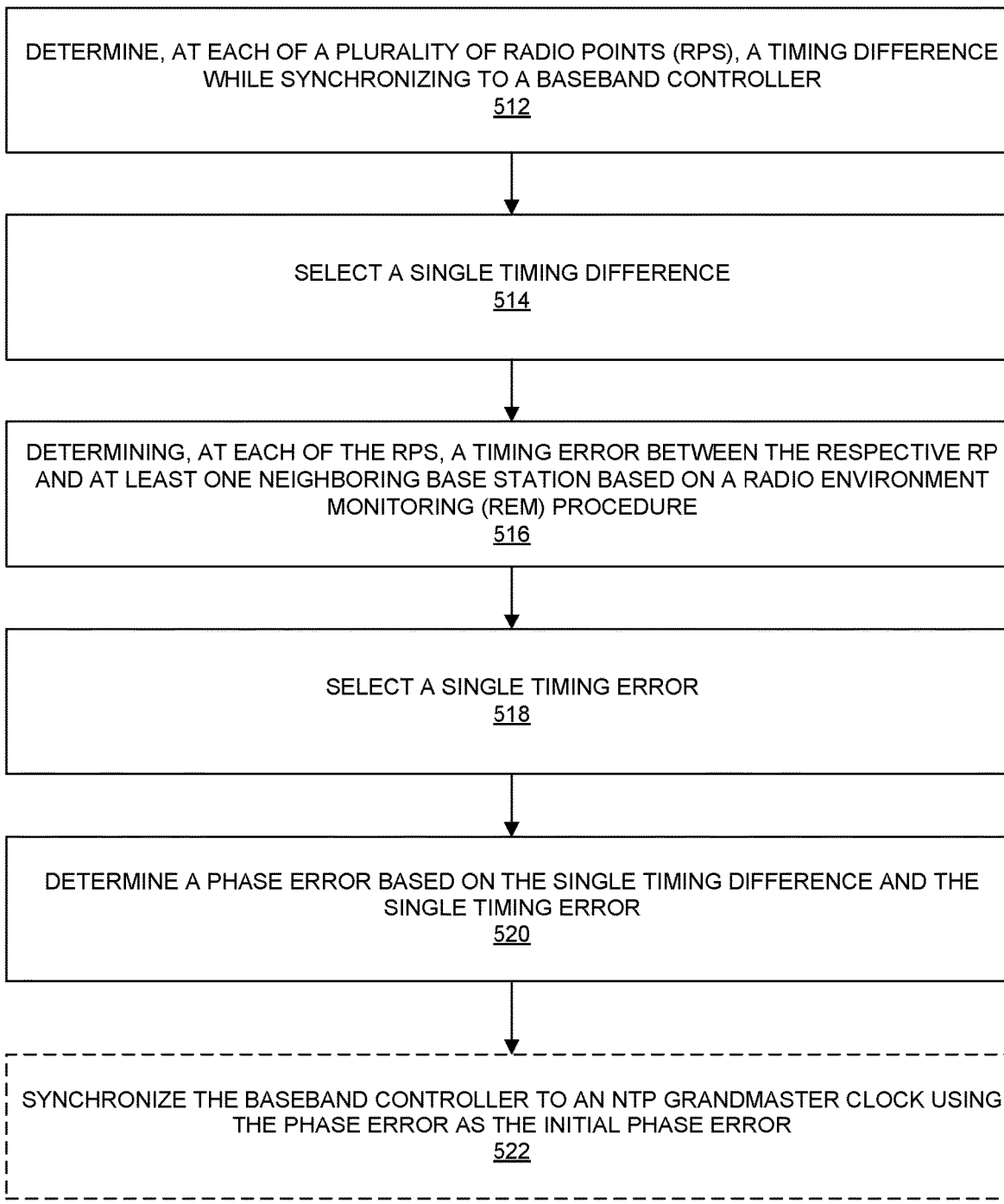
FIG. 5B is a flow diagram illustrating another example method for synchronizing a C-RAN to an NTP reference (grandmaster) clock.

FIG. 5B is a flow diagram illustrating an example method 500B for synchronizing a C-RAN 100 to an NTP reference (grandmaster) clock 108. The method 500B may be performed by at least a baseband controller 104 and at least one RP 106, together forming at least a portion of a C-RAN 100 that provides wireless service to UEs 110. The method 500B may further include steps involving the NTP grandmaster clock 108 and/or at least one neighboring base station 118. Each of the baseband controller 104, the RP(s) 106, a neighboring base station 118, and the grandmaster clock 108 include at least one oscillator. In contrast to the method 500A of FIG. 5A, the method 500B in FIG. 5B is performed for more than one RP 106 more than one neighboring base station 118.

The blocks of the flow diagram shown in FIG. 5B have been arranged in a generally sequential manner for ease of explanation; however, it is to be understood that this arrangement is merely exemplary, and it should be recognized that the processing associated with method 500B (and the blocks shown in FIG. 5B) can occur in a different order (for example, where at least some of the processing associated with the blocks is performed in parallel and/or in an event-driven manner). Also, most standard exception handling is not described for ease of explanation; however, it is to be understood that method 500B can and typically would include such exception handling.

The method 500B may begin at step 512 where each of a plurality of RP 106 determines a timing difference (between it and the baseband controller 104) while synchronizing to the baseband controller 104. This synchronization may include using an IEEE 1588 procedure as described above. In some configurations, only the estimation phase of IEEE 1588 synchronization is used (to determine a delta1 for each RP 106), as described above. In other configurations, each delta1 may be determined using the estimation phase, coasting phase, and LOCK phase of the complete IEEE 1588 synchronization, as described above.

The method 500B may proceed at step 514 where a single timing difference (delta1) is selected. Since the RPs 106 are synchronized to the baseband controller 106, the different delta1 values are expected to be close in value. The single timing difference (delta1) may be selected based on order it was received, randomly, etc. Instead of determining multiple timing differences (delta1 values) and selecting one of them, only a single timing difference (delta1) is determined in some configurations and used as a representative timing difference (delta1) for all RPs 106. Alternatively still, a different delta1 value may be determined and used for each RP 106.

The method 500B may proceed at step 516 where each of the RPs 106 determines a timing error between the respective RP 106 and at least one neighboring base station 118 based on a radio environment monitoring (REM) procedure. During its REM procedure, each RP 106 may monitor downlink signals transmitted by each of the at least one neighboring base station 118. The REM in each RP 106 may be triggered using a message transmitted by the baseband controller 104.

As described above, each RP 106 may perform the following steps (during REM) with respect to the at least one neighboring base station 118: (1) frequency synchronization (also referred to as carrier frequency offset (CFO) estimation) using the Primary Synchronization Signal (PSS) of each neighbor base station 118; (2) slot synchronization (referred to as PSS synchronization); (3) frame synchronization/PCI detection (referred to as Secondary Synchronization Signal (SSS) synchronization); and optionally (4) fine frequency estimation (referred to as Cell Specific Reference Signal (CS-RS) synchronization). The REM performed at each RP 106 may produce a frequency error, which is converted to a timing error (referred to as "delta2"), for each neighboring base station 118.

If multiple delta2 values are received for the same neighboring base station 118, the baseband controller 104 may select, for the neighboring base station 118, the delta2 value that was sent from the RP 106 that detected the neighboring base station 118 with the highest strength, e.g., RSRP. Alternatively, only the delta2 values (for the same neighboring base station 118), which were determined by RPs 106 that detected the neighboring base station 118 with RSRP values that are within a certain percentile, are averaged, e.g., only delta2 values from RPs 106 that detected the neighboring base station 118 with RSRPs in the 90th percentile of all RPs 106 that detected the neighboring base station 118.

The method 500B may proceed at step 518 where the baseband controller 104 may select a single timing error (delta2), e.g., to use when determining a phase error below. In other words, the baseband controller 104 may select a single delta2 from all delta2 values it receives, e.g., from multiple RPs 106 and/or for multiple neighboring base stations 118. In some configurations, baseband controller 104 may select the delta2 associated with a neighboring base station 118 that was (1) determined to be a macro base station; and (2) received/detected with the highest RSRP amongst all neighboring base stations 118 (that are macro base stations) detected by all RPs 106. Alternatively, the baseband controller 104 may select a single delta2 value by averaging a group of delta2 values it received from the RPs 106. In one example, the baseband controller 104 may rank the RSRP with which each neighboring base station 118 is received by any RP 106. The baseband controller 104 may then average the delta2 values associated with the Nth (e.g., 90th) percentile of reported RSRP values. This average may be used as the single delta2 value.

The method 500B may proceed at step 520 where a phase error is determined based on the single timing difference (delta1) and the single timing error (delta2). The phase error, approximately indicating error between the baseband controller 104 and some universal reference clock, may be determined as the sum of the single timing difference (delta1) and the single timing error (delta2). The phase error may be determined at the baseband controller 104 using the single timing difference (delta1) and the single timing error (delta2) received from the RPs 106.

The method 500B may proceed at optional step 522 where the baseband controller 104 synchronizes to an NTP grandmaster clock 108 using the phase error as the initial phase error. In other words, the baseband controller 104 may use the selected phase error to estimate and correct the relative frequency error of its oscillator with respect to the NTP grandmaster clock 108.

The NTP synchronization procedure may use a Kalman filter, which takes a relatively long time (e.g., more than 10 minutes) in the absence of an initial phase-estimate. Using the initial phase-estimate as described herein will enable Kalman filter to perform efficient multi-variate optimization and converge quicker to the required accuracy of less than 30 ppb relative phase between baseband controller 104 oscillator (e.g., as part of a phase-locked loop (PLL)) and the NTP grandmaster clock 108.

Example 5G System

Figure 6:
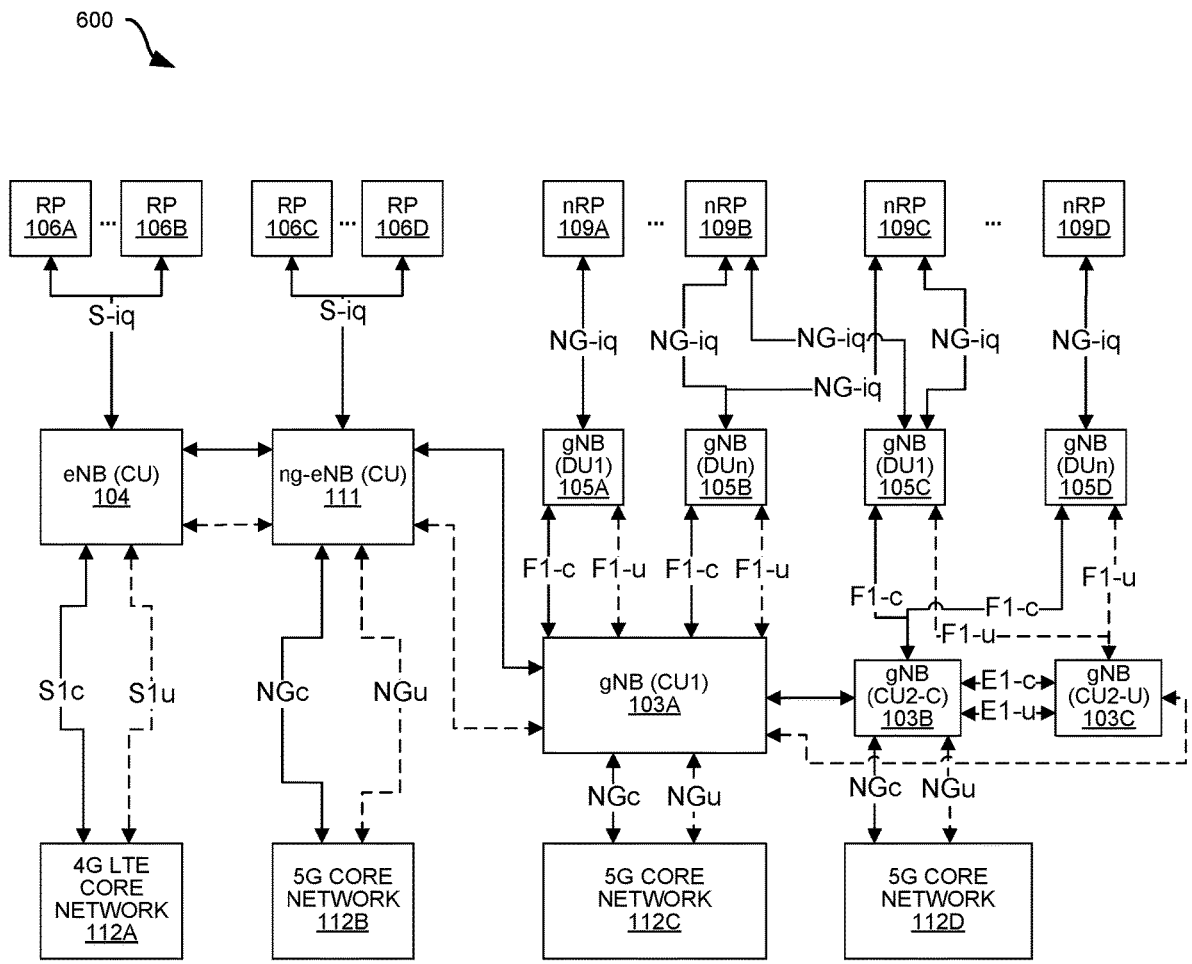
FIG. 6 is a block diagram illustrating an exemplary configuration of a system that includes 3GPP Fourth Generation (4G) and Fifth Generation (5G) components.

FIG. 6 is a block diagram illustrating an exemplary configuration of a system 600 that includes 3GPP Fourth Generation (4G) and Fifth Generation (5G) components. Alternatively, the system 600 may include only 4G or only 5G components. Each of the components may be implemented using at least one processor executing instructions stored in at least one memory. In some configurations, at least some of the components are implemented using a virtual machine. The system 600 may implement fronthaul OMs 118, as described below.

Fifth Generation (5G) standards support a wide variety of applications, bandwidth, and latencies while supporting various implementation options. In the system 600, interfaces denoted with "–C" (illustrated with solid lines) provide control plane connectivity, while interfaces denoted with ("–U") (illustrated with dashed lines) provide user plane connectivity. More explanation of the various devices and interfaces in FIG. 6 can be found in 3GPP TR 38.801 Radio Access Architecture and Interfaces, Release 14 (available at https://portal.3gpp.org/desktopmodules/Specifications/SpecificationDetails.aspx? specificationId=3056), which is incorporated by reference herein. FIG. 6 illustrates three different types of access networks: an eNodeB (eNB) on the left, an LTE Next Generation eNodeB (ng-eNB), and two different examples of a 5G Next Generation NodeB (gNB controller) on the right.

The LTE eNB may include a Central Unit (CU) (e.g., that is implemented in a baseband controller 104) and a set of RPs 106A-B. An LTE S1 interface (including the S1c part (control plane) and S1u part (user plane)) is used between CU 104 and at least one wireless service provider's LTE core network 112A. As described above, the RPs 106A-B may communicate I/Q data to the CU 104 using the LTE S-iq interface.

In some configurations: (1) the RPs 106A-B synchronize to the CU 104 (and each determine a timing difference, delta1); (2) each RP 106A-B determines a frequency error between itself and at least one neighboring base station (not shown in FIG. 6), which is converted to a timing error; (3) a phase error is determined for each neighboring base station monitored during a REM process (performed by any of the RPs 106A-B); (4) one of multiple phase errors are selected; and (5) the CU 104 uses the selected phase error as the initial phase error while synchronizing to an NTP grandmaster clock (not shown in FIG. 6).

In the example in FIG. 6, the ng-eNB may include a Central Unit (CU) 111 and a set of RPs 106C-D. The CU 111 communicate with at least one wireless service provider's Next Generation Cores (NGC) 112B using the 5G NGc and 5G NGu interfaces. The RPs 106C-D in the ng-eNB may also communicate I/Q data to the CU 111, e.g., using the LTE S-iq interface. The ng-eNB may provide LTE and/or 5G service to UEs 110.

In some configurations: (1) the RPs 106C-D synchronize to the ng-eNB CU 111 (and each determine a timing difference, delta1); (2) each RP 106C-D determines a frequency error between itself and at least one neighboring base station (not shown in FIG. 6), which is converted to a timing error; (3) a phase error is determined for each neighboring base station monitored during a REM process (performed by any of the RPs 106C-D); (4) one of multiple phase errors are selected; and (5) the ng-eNB CU 111 uses the selected phase error as the initial phase error while synchronizing to an NTP grandmaster clock (not shown in FIG. 6).

The architecture of a Next Generation NodeB (gNB controller) is partitioned into a 5G Central Unit (CU) 103A-C and a 5G Distributed Unit (DU) 105A-D. A 5G Central Unit (CU) 103 is a node that includes the gNB controller functions such as the transfer of user data, mobility control, radio access network sharing, positioning, session management, etc. The 5G CU 103 controls the operation of the Distributed Units (DUs) 105A-D over a fronthaul interface (including F1-c and F1-u for the control plane and user plane, respectively). The 5G CU 103 may communicate with at least one wireless service provider's Next Generation Cores (NGC) 112C-D using 5G NGc and 5G NGu interfaces.

The Distributed Units (DUs) 105 may be nodes that implement a subset of the gNB controller functions, depending on the functional split (between CU 103 and DU 105). In some configurations, the L3 functionality may be implemented in the CU 103 and the L2 operations may be implemented in the DU 105. The operation of each DU 105 is controlled by a CU 103. The functions of the DU 105 may include Radio Link Control (RLC), portions of Medium Access Control (MAC) and/or portions of the physical (PHY) layer functions. A Distributed Unit (DU) can further offload some of its PHY functions to RPs 106.

In some configurations, a 5G CU is split between a CU-C 103B that handles control plane functions and a CU-U 103C that handles user plane functions. In a split configuration, the CU-C 103B may communicate with the CU-U 103C using 5G E1-c and 5G E1-u interfaces, respectively.

In one configuration, the Next generation RPs (nRPs) 109A-D may communicate baseband signal data to the DUs 105 on an NG-iq interface. In some configurations, the nRPs 109 may implement at least some of the Layer-1 and/or Layer-2 functions. In some configurations, the nRPs 109 may have multiple ETHERNET ports and can communicate with multiple switches.

Any of the interfaces in FIG. 6 may be implemented using a switched ETHERNET (or fiber) network. Additionally, the various CUs in FIG. 6 may communicate with each other using any suitable interface, e.g., an Xn (Xn-c and Xn-u) and/or X2 interface. A fronthaul interface (not shown in FIG. 6) may facilitate any of S-iq, NG-iq, F1-c, and/or F1-u interfaces in FIG. 6.

In some configurations: (1) the nRPs 109A-D synchronize to the DU 105A-D and/or CU 103A-C (and each determine a timing difference, delta1); (2) each nRP 109A-D determines a frequency error between itself and at least one neighboring base station (not shown in FIG. 6), which is converted to a timing error; (3) a phase error is determined for each neighboring base station monitored during a REM process (performed by any of the nRPs 109A-D); (4) one of multiple phase errors are selected; and (5) the DU 105A-D and/or CU 103A-C uses the selected phase error as the initial phase error while synchronizing to an NTP grandmaster clock (not shown in FIG. 6).

Example RP Using a Mobile Chip for REM

Figure 7:
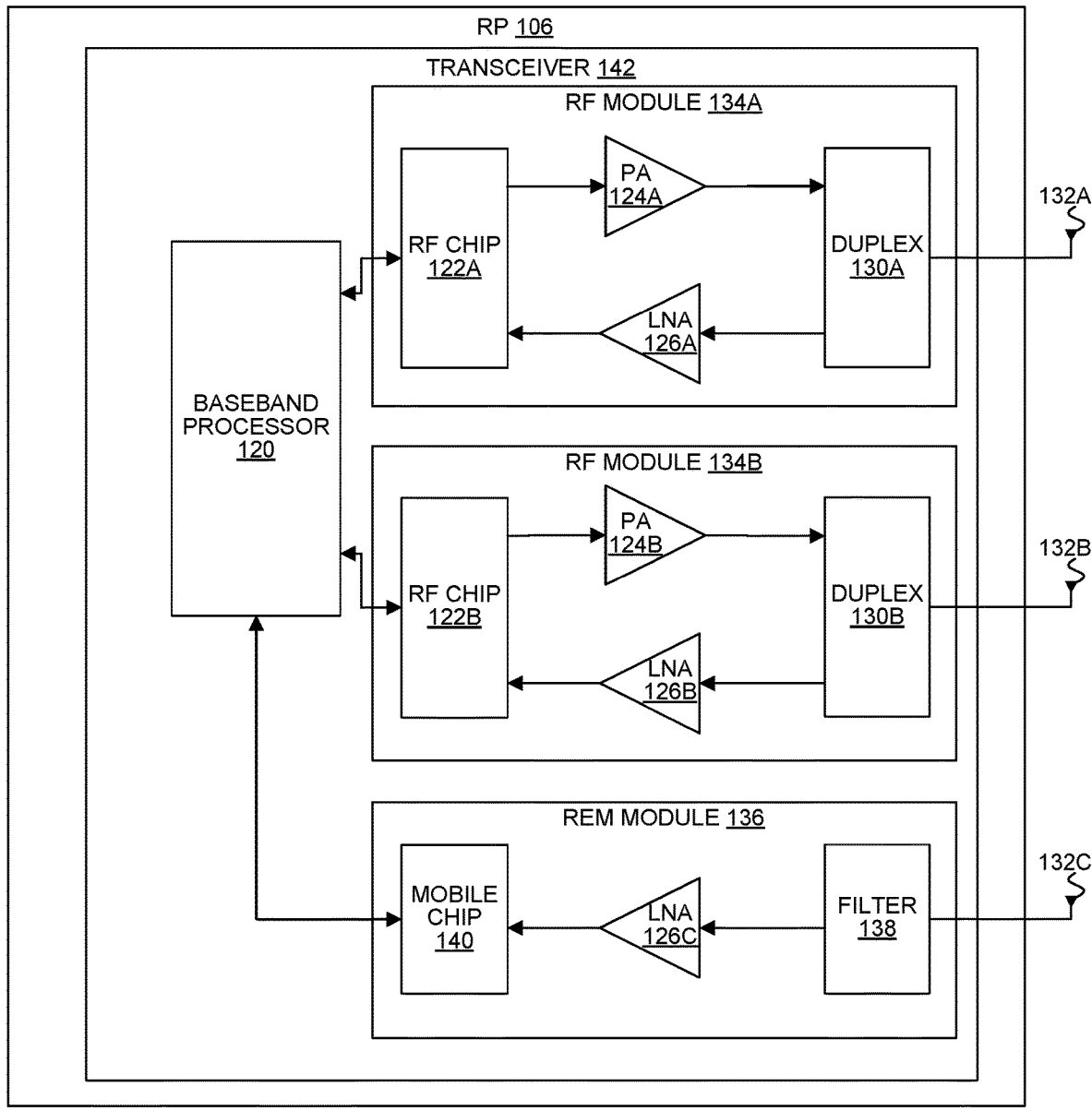
FIG. 7 is a block diagram illustrating an example multi-band, multi-carrier transceiver in an RP performing REM.

FIG. 7 is a block diagram illustrating an example multi-band, multi-carrier transceiver 142 in an RP 106 performing REM. The example multi-band, multi-carrier transceiver 142 may include a baseband processor 120 and RF modules 134A-B with RF chips 122A-B, duplexers 130A-B, power amplifiers 124A-B, and low-noise amplifiers 126A-B. Additionally, it is understood that other configurations for REM using a mobile chip 140 are possible and may be used with the present systems and methods. For example, U.S. Provisional Application No. 62/831,603 titled "RADIO ENVIRONMENT MONITORING IN A BASE STATION USING A MOBILE CHIP", filed Apr. 9, 2019, describes various configurations using a mobile chip and is hereby incorporated by reference in its entirety.

The baseband processor 120 may be configured to execute instructions perform at least some of the functionality of the RP 106 in which the transceiver 142 resides, e.g., managing radio functions in the RP 106. For example, in an RP 106, the baseband processor 120 may implement at least a portion of the physical layer; operations, administration and management (OAM) functions; and a radio controller.

Additionally, the multi-band, multi-carrier transceiver 142 in FIG. 7 implements an additional REM module 136 and antenna 132C that may be dedicated to the REM process. In other words, in one configuration, the dedicated antenna 132C of the REM module 136 may not be used for RF transmissions or receiving RF signals other than the RF signals received during the REM process. While two RF modules 134 and antennas 132 are illustrated, it is understood that any number of RF modules 134 and/or antennas 132 may be used in the multi-band, multi-carrier transceiver 142.

The REM module 136 may include a mobile chip 140, a low-noise amplifier 126C, and a filter 138. In some configurations, the mobile chip 140 may be smaller and/or consume less power than each RF chip 122. For example, the mobile chip 140 may include circuitry designed for a mobile, battery-powered UE 110 but used in the REM module 136 of an RP 106. In some configurations, the entire REM module 136 may be sold as a commercial unit, e.g., based on a CAT-M1. This type of commercial module has been prohibitively expensive for use as a dedicated REM module 136 until recently.

The REM module 136 may include a filter 138 that is communicatively coupled to an antenna 132C that receives RF signals. The filter 138 may filter for a particular transmit frequency (or band of frequencies) of neighboring base stations 118. The filter 138 may be communicatively coupled to a low-noise amplifier 126C that amplifies received RF signals before sending to the mobile chip 140. The mobile chip 140 may include circuitry configured to at least (1) upconvert baseband signals from the baseband processor 120 into RF signals; and/or (2) downconvert RF signals from the filter 138 into baseband signals.

In some configurations, instructions executable to perform at least some of the REM procedure, described herein, will execute on the mobile chip 140. In some configurations, the baseband processor 120 may include instructions executable to tune (e.g., band-lock) the mobile chip 140 to a particular frequency band (e.g., LTE band 1), after which the mobile chip 140 may perform REM for an Absolute Radio Frequency Numbers (ARFCNs) in that frequency band and report back to baseband processor 120. In some configurations, the mobile chip 140 may sequentially tune to multiple ARFCNs in the particular frequency band and determine at least one REM parameter for each ARFCN.

With reference to FIGS. 2 and 5, the transceiver 142 may perform synchronization to the baseband controller 104 (e.g., as in steps 202A and 502) and determine a timing difference (delta1). In some configurations, the REM module 136 and the baseband processor 120 may perform the REM procedure for the RP 106 and determine at least one frequency error (e.g., as in steps 204A and 504), which is converted to a timing error (delta2). For example, the mobile chip 140 may report out (to the baseband processor 120) the frequency error for each neighboring base station 118 monitored during REM, after which the baseband processor 120 converts the frequency error to a timing error. In some configurations, delta1 and delta2 values are sent from the RP 106 to the baseband controller 104 so the baseband controller 104 may determine a phase error for each neighboring base station 118 that was monitored during REM. In other configurations, the baseband processor 120 on the RP 106 may determine and send a phase error (for each neighboring base station 118 that it monitored during REM) to the baseband controller 104.

The baseband processor 120 and RF modules 134A-B may be located on a baseband card, e.g., a single continuous substrate that supports and electrically connects various circuitry, such as a printed circuit board (PCB). The REM module 136 may similarly be located on a secondary card in the same physical housing as the baseband card. Alternatively, the REM module 136 may also be located on the baseband card.

The configuration illustrated in FIG. 7 may include some modifications to the baseband card (with the baseband processor 120) and/or the secondary card (with the REM module 136). For example, an interface to be added or exposed on baseband card beyond what is otherwise available. The baseband processor 120 may interface with the REM module 136 using at least one interface, e.g., a universal asynchronous receiver-transmitter (UART) interface and/or a universal serial bus (USB) interface. In some configurations, the baseband processor 120 may interface with the REM module 136 using a USB to UART bridge, e.g., circuitry configured to enable connectivity of a first device communicating on a USB interface with a second device communicating on a UART interface.

The example multi-band, multi-carrier transceiver 142 in FIG. 7 may include advantages compared to conventional transceivers performing REM. By moving the majority of the REM processing to the mobile chip 140 (instead of the RF chip(s) 122), the RF chip(s) 122 do not require modification to perform REM. Additionally, using a dedicated REM module 136 enables a base station 100 to perform REM and simultaneously receive and/or transmit other RF signals, e.g., with UEs 110. In other words, the base station 100 using the transceiver 142 of FIG. 7 may operate normally while also performing REM.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. For example, where a computing device is described as performing an action, the computing device may carry out this action using at least one processor executing instructions stored on at least one memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

Terminology

Brief definitions of terms, abbreviations, and phrases used throughout this application are given below.

The term "determining" and its variants may include calculating, extracting, generating, computing, processing, deriving, modeling, investigating, looking up (e.g., looking up in a table, a database or another data structure), ascertaining and the like. Also, "determining" may also include receiving (e.g., receiving information), accessing (e.g., accessing data in a memory) and the like. Also, "determining" may include resolving, selecting, choosing, establishing and the like.

The phrase "based on" does not mean "based only on," unless expressly specified otherwise. In other words, the phrase "based on" describes both "based only on" and "based at least on". Additionally, the term "and/or" means "and" or "or". For example, "A and/or B" can mean "A", "B", or "A and B". Additionally, "A, B, and/or C" can mean "A alone," "B alone," "C alone," "A and B," "A and C," "B and C" or "A, B, and C."

The terms "connected", "coupled", and "communicatively coupled" and related terms may refer to direct or indirect connections. If the specification states a component or feature "may," "can," "could," or "might" be included or have a characteristic, that particular component or feature is not required to be included or have the characteristic.

The terms "responsive" or "in response to" may indicate that an action is performed completely or partially in response to another action. The term "module" refers to a functional component implemented in software, hardware, or firmware (or any combination thereof) component.

The methods disclosed herein comprise one or more steps or actions for achieving the described method. Unless a specific order of steps or actions is required for proper operation of the method that is being described, the order and/or use of specific steps and/or actions may be modified without departing from the scope of the claims.

In conclusion, the present disclosure provides novel systems, methods, and arrangements for synchronizing a C-RAN to an NTP reference clock. While detailed descriptions of one or more configurations of the disclosure have been given above, various alternatives, modifications, and equivalents will be apparent to those skilled in the art without varying from the spirit of the disclosure. For example, while the configurations described above refer to particular features, functions, procedures, components, elements, and/or structures, the scope of this disclosure also includes configurations having different combinations of features, functions, procedures, components, elements, and/or structures, and configurations that do not include all of the described features, functions, procedures, components, elements, and/or structures. Accordingly, the scope of the present disclosure is intended to embrace all such alternatives, modifications, and variations as fall within the scope of the claims, together with all equivalents thereof. Therefore, the above description should not be taken as limiting.

Example Embodiments

Example 1 includes a cloud radio access network (C-RAN), comprising: a baseband controller communicatively coupled to a plurality of radio points (RP) via a fronthaul network; the plurality of RPs, each configured to exchange radio frequency (RF) signals with at least one user equipment (UE), one of the RPs being configured to: determine a timing difference while synchronizing to the baseband controller; determine a frequency error, between the RP and a neighboring base station, based on a radio environment monitoring (REM) procedure; and wherein a phase error is determined based on the timing difference for the RP and the frequency error for the RP and the neighboring base station.

Example 2 includes the C-RAN of Example 1, wherein the baseband controller is configured to synchronize to a Network Timing Protocol (NTP) grandmaster clock using the phase error as an initial phase error.

Example 3 includes the C-RAN of Example 2, wherein the timing difference is determined before the baseband controller synchronizes to the NTP grandmaster clock.

Example 4 includes the C-RAN of any of Examples 1-3, wherein the timing difference is a timing difference between an oscillator in the RP and an oscillator in the baseband controller.

Example 5 includes the C-RAN of any of Examples 1-4, wherein the RP is further configured to determine the timing difference using a time-stamping protocol, implemented over the User Datagram Protocol (UDP)/Internet Protocol (IP), between the baseband controller acting as a master clock and the RP acting as a slave clock.

Example 6 includes the C-RAN of Example 5, wherein the time-stamping protocol is Institute of Electrical and Electronics Engineers 1588 standard (IEEE 1588); wherein the timing difference is determined using one of the following: only the estimation phase of 1588 IEEE synchronization between baseband controller and the RP; and the estimation phase, coasting phase, and lock phase of IEEE 1588 synchronization.

Example 7 includes the C-RAN of any of Examples 1-6, wherein the REM procedure comprises the RP monitoring downlink signals transmitted by the neighboring base station.

Example 8 includes the C-RAN of Example 7, wherein the downlink signals monitored during REM comprise at least a Primary Synchronization Signal (PSS) and a Secondary Synchronization Signal (SSS) transmitted by the neighboring base station.

Example 9 includes the C-RAN of Example 8, wherein the downlink signals monitored during REM further comprise a Cell Specific Reference Signal (CS-RS) transmitted by the neighboring base station.

Example 10 includes the C-RAN of any of Examples 8-9, wherein monitoring the PSS comprises iteratively performing PSS correlation-based frequency-error estimation; and wherein symbol derotation is performed for frequency correction, following each iteration of PSS correlation-based frequency-error estimation, using circuitry in the RP configured to perform physical uplink Fast Fourier Transform (PUFFT).

Example 11 includes the C-RAN of any of Examples 1-10, wherein each of the plurality of RPs determines a respective timing difference between a respective oscillator in the respective RP and an oscillator in the baseband controller; and wherein the baseband controller selects the timing difference from a plurality of timing differences.

Example 12 includes the C-RAN of any of Examples 1-11, wherein each of the plurality of RPs determines, based on a respective REM procedure, a respective frequency error for each of at least one neighboring base station monitored during the respective REM procedure; and wherein the baseband controller selects the frequency error from a plurality of frequency errors.

Example 13 includes the C-RAN of Example 12, wherein the baseband controller is configured to select the frequency error by: identifying a physical cell identifier (PCI) belonging to a neighboring base station that is a macro base station that is detected, at the RP, with a strongest reference signal received power (RSRP); and selecting a frequency error, associated with the neighboring base station having the identified PCI, as the initial phase error.

Example 14 includes the C-RAN of any of Examples 1-13, wherein the phase error is determined by: converting the frequency error to a timing error; and summing the timing difference and the frequency error.

Example 15 includes a method, comprising: determining, at a radio point (RP) in a cloud radio access network (C-RAN), a timing difference while synchronizing to a baseband controller in the C-RAN; determining a frequency error, between the RP and a neighboring base station, based on a radio environment monitoring (REM) procedure performed at the RP; and determining a phase error based on the timing difference for the RP and the frequency error for the RP and the neighboring base station.

Example 16 includes the method of Example 15, further comprising synchronizing the baseband controller to a Network Timing Protocol (NTP) grandmaster clock using the phase error as an initial phase error.

Example 17 includes the method of Example 16, wherein the timing difference is determined before the baseband controller synchronizes to the NTP grandmaster clock.

Example 18 includes the method of any of Examples 15-17, wherein the timing difference is a timing difference between an oscillator in the RP and an oscillator in the baseband controller.

Example 19 includes the method of any of Examples 15-18, wherein determining the timing difference comprises determining the timing difference using a time-stamping protocol, implemented over the User Datagram Protocol (UDP)/Internet Protocol (IP), between the baseband controller acting as a master clock and the RP acting as a slave clock.

Example 20 includes the method of Example 19, wherein the time-stamping protocol is Institute of Electrical and Electronics Engineers 1588 standard (IEEE 1588); wherein the timing difference is determined using one of the following: only the estimation phase of 1588 IEEE synchronization between baseband controller and the RP; and the estimation phase, coasting phase, and lock phase of IEEE 1588 synchronization.

Example 21 includes the method of any of Examples 15-20, wherein the REM procedure comprises the RP monitoring downlink signals transmitted by the neighboring base station.

Example 22 includes the method of Example 21, wherein the downlink signals monitored during REM comprise at least a Primary Synchronization Signal (PSS) and a Secondary Synchronization Signal (SSS) transmitted by the neighboring base station.

Example 23 includes the method of Example 22, wherein the downlink signals monitored during REM further comprise a Cell Specific Reference Signal (CS-RS) transmitted by the neighboring base station.

Example 24 includes the method of any of Examples 22-23, wherein monitoring the PSS comprises iteratively performing PSS correlation-based frequency-error estimation; and wherein symbol derotation is performed for frequency correction, following each iteration of PSS correlation-based frequency-error estimation, using circuitry in the RP configured to perform physical uplink Fast Fourier Transform (PUFFT).

Example 25 includes the method of any of Examples 15-24, wherein each of a plurality of RPs determines a respective timing difference between a respective oscillator in the respective RP and an oscillator in the baseband controller; and wherein the baseband controller selects the timing difference from a plurality of timing differences.

Example 26 includes the method of any of Examples 15-25, wherein each of a plurality of RPs determines, based on a respective REM procedure, a respective frequency error for each of at least one neighboring base station monitored during the respective REM procedure; and wherein the baseband controller selects the frequency error from a plurality of frequency errors.

Example 27 includes the method of Example 26, wherein the frequency error is selected by: identifying a physical cell identifier (PCI) belonging to a neighboring base station that is a macro base station that is detected, at the RP, with a strongest reference signal received power (RSRP); and selecting a frequency error, associated with the neighboring base station having the identified PCI, as the initial phase error.

Example 28 includes the method of any of Examples 15-27, wherein the phase error is determined by: converting the frequency error to a timing error; and summing the timing difference and the frequency error.

The invention claimed is:

1. A cloud radio access network (C-RAN), comprising:
  a baseband controller communicatively coupled to a plurality of radio points (RP) via a fronthaul network; and
  the plurality of RPs, each configured to exchange radio frequency (RF) signals with at least one user equipment (UE), at least one of the plurality of RPs being configured to:
    determine at least a timing difference, between the RP and the baseband controller, while synchronizing to the baseband controller;
    monitor downlink signals transmitted by a neighboring base station, during a radio environment monitoring (REM) procedure, to determine a phase error and a frequency error between the RP and the neighboring base station; and
  wherein a total phase error is determined for the baseband controller based on at least the timing difference, between the RP and the baseband controller, the phase error, and the frequency error between the RP and the neighboring base station.

2. The C-RAN of claim 1, wherein the baseband controller is configured to synchronize to a Network Timing Protocol (NTP) grandmaster clock using the total phase error as an initial phase error estimate.

3. The C-RAN of claim 2, wherein the timing difference is determined before the baseband controller synchronizes to the NTP grandmaster clock.

4. The C-RAN of claim 1, wherein the RP is further configured to determine at least the timing difference using a time-stamping protocol, implemented over User Datagram Protocol (UDP)/Internet Protocol (IP), between the baseband controller acting as a master clock and the RP acting as a slave clock.

5. The C-RAN of claim 4, wherein the time-stamping protocol is Institute of Electrical and Electronics Engineers 1588 standard (IEEE 1588);
  wherein the timing difference is determined using one of the following:
    only an estimation phase of 1588 IEEE synchronization between the baseband controller and the RP; and
    the estimation phase, coasting phase, and lock phase of IEEE 1588 synchronization.

6. The C-RAN of claim 1, wherein the downlink signals monitored during REM comprise at least a Primary Synchronization Signal (PSS) and a Secondary Synchronization Signal (SSS) transmitted by the neighboring base station.

7. The C-RAN of claim 6, wherein the downlink signals monitored during REM further comprise a Cell Specific Reference Signal (CS-RS) transmitted by the neighboring base station.

8. The C-RAN of claim 6,
  wherein monitoring the PSS comprises iteratively performing PSS correlation-based frequency-error estimation and phase-error estimation; and
  wherein symbol derotation is performed for frequency correction, following each iteration of the PSS correlation-based frequency-error estimation, using circuitry in the RP configured to perform physical uplink Fast Fourier Transform (PUFFT).

9. The C-RAN of claim 1,
  wherein at least one of the plurality of RPs determines a respective timing difference between a respective oscillator in the respective RP and an oscillator in the baseband controller; and
  wherein the baseband controller selects the timing difference from a plurality of timing differences.

10. The C-RAN of claim 1,
  wherein at least one of the plurality of RPs determines, based on a respective REM procedure, a respective frequency error for each of at least one neighboring base station monitored during the respective REM procedure; and
  wherein the baseband controller selects the frequency error from a plurality of frequency errors.

11. The C-RAN of claim 10, wherein the baseband controller is configured to select the frequency error by:
  identifying a physical cell identifier (PCI) belonging to a neighboring base station that is a macro base station that is detected, at the RP, with a strongest reference signal received power (RSRP); and
  selecting a frequency error, associated with the neighboring base station having the identified PCI, and using it to determine an initial phase error estimate for the baseband controller.

12. The C-RAN of claim 1, wherein the total phase error is determined at least by:
  converting the frequency error to a timing error; and
  summing the timing difference and the timing error.

13. The C-RAN of claim 1, wherein the baseband controller is configured to adjust, prior to synchronizing with at least one NTP server, an oscillator in the baseband controller using the frequency error and the total phase error that is based on at least the timing difference, the phase error, and the frequency error between the RP and the neighboring base station.

14. A method, comprising:
   determining, at a radio point (RP) in a cloud radio access network (C-RAN), at least a timing difference, between the RP and a baseband controller, while synchronizing to the baseband controller in the C-RAN;
   monitoring downlink signals transmitted by a neighboring base station, during a radio environment monitoring (REM) procedure at the RP, to determine a phase error and a frequency error between the RP and the neighboring base station; and
   determining a total phase error for the baseband controller based on the timing difference, between the RP and the baseband controller, the phase error, and the frequency error between the RP and the neighboring base station.

15. The method of claim 14, further comprising synchronizing the baseband controller to a Network Timing Protocol (NTP) grandmaster clock using the total phase error as an initial phase error estimate.

16. The method of claim 15, wherein the timing difference is determined before the baseband controller synchronizes to the NTP grandmaster clock.

17. The method of claim 14, wherein determining the timing difference comprises determining at least the timing difference using a time-stamping protocol, implemented over User Datagram Protocol (UDP)/Internet Protocol (IP), between the baseband controller acting as a master clock and the RP acting as a slave clock.

18. The method of claim 17, wherein the time-stamping protocol is Institute of Electrical and Electronics Engineers 1588 standard (IEEE 1588);
   wherein the timing difference is determined using one of the following:
      only an estimation phase of 1588 IEEE synchronization between the baseband controller and the RP; and
      the estimation phase, coasting phase, and lock phase of IEEE 1588 synchronization.

19. The method of claim 14, wherein the downlink signals monitored during REM comprise at least a Primary Synchronization Signal (PSS) and a Secondary Synchronization Signal (SSS) transmitted by the neighboring base station.

20. The method of claim 19, wherein the downlink signals monitored during REM further comprise a Cell Specific Reference Signal (CS-RS) transmitted by the neighboring base station.

21. The method of claim 19,
   wherein monitoring the PSS comprises iteratively performing PSS correlation-based frequency-error estimation and phase-error estimation; and
   wherein symbol derotation is performed for frequency correction, following each iteration of the PSS correlation-based frequency-error estimation, using circuitry in the RP configured to perform physical uplink Fast Fourier Transform (PUFFT).

22. The method of claim 14,
   wherein at least one of a plurality of RPs determines a respective timing difference between a respective oscillator in the respective RP and an oscillator in the baseband controller; and
   wherein the baseband controller selects the timing difference from a plurality of timing differences.

23. The method of claim 14,
   wherein at least one of a plurality of RPs determines, based on a respective REM procedure, a respective frequency error for each of at least one neighboring base station monitored during the respective REM procedure; and
   wherein the baseband controller selects the frequency error from a plurality of frequency errors.

24. The method of claim 23, wherein the frequency error is selected by:
   identifying a physical cell identifier (PCI) belonging to a neighboring base station that is a macro base station that is detected, at the RP, with a strongest reference signal received power (RSRP); and
   selecting a frequency error, associated with the neighboring base station having the identified PCI, and using it to determine an initial phase error estimate for the baseband controller.

25. The method of claim 14, wherein the total phase error is determined at least by:
   converting the frequency error to a timing error; and
   summing the timing difference and the timing error.

* * * * *